(12) United States Patent
Chen et al.

(10) Patent No.: US 11,609,408 B2
(45) Date of Patent: Mar. 21, 2023

(54) OPTICAL IMAGING LENS

(71) Applicant: Genius Electronic Optical (Xiamen) Co., Ltd., Fujian (CN)

(72) Inventors: Feng Chen, Fujian (CN); Yanxuan Yin, Fujian (CN); Citian You, Fujian (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 303 days.

(21) Appl. No.: 16/869,523

(22) Filed: May 7, 2020

(65) Prior Publication Data
US 2021/0157095 A1    May 27, 2021

(30) Foreign Application Priority Data
Nov. 21, 2019   (CN) .......................... 201911148096.5

(51) Int. Cl.
*G02B 9/60* (2006.01)
*G02B 13/20* (2006.01)
*G02B 13/00* (2006.01)
*G02B 13/02* (2006.01)
(Continued)

(52) U.S. Cl.
CPC ........... *G02B 13/0045* (2013.01); *G02B 9/60* (2013.01); *G02B 13/02* (2013.01); *G02B 13/20* (2013.01); *G02B 27/0025* (2013.01); *H04N 5/2254* (2013.01)

(58) Field of Classification Search
None
See application file for complete search history.

(56) References Cited

U.S. PATENT DOCUMENTS 5,267,086 A * 11/1993 Hirano .................... G02B 13/20
                                                              359/795
5,757,555 A *  5/1998 Sato ........................ G02B 13/02
                                                              359/557
9,664,880 B2   5/2017 Yoneyama et al.
(Continued)

FOREIGN PATENT DOCUMENTS

CN       101246253 B    10/2011
CN       206773267 U    12/2017
(Continued)

OTHER PUBLICATIONS

Taiwanese Office Action, dated Jan. 29, 2021, in a counterpart Taiwanese patent application, No. TW 109128418.
(Continued)

*Primary Examiner* — Darryl J Collins
(74) *Attorney, Agent, or Firm* — Chen Yoshimura LLP

(57) ABSTRACT

The present invention provides an optical imaging lens. The optical imaging lens comprises five lens elements positioned in an order from an object side to an image side, each of which has an object-side surface facing the object side and an image-side surface facing the image side. Counting from the object side to the image side, the five lens are labeled as a first lens element, a second lens element, a third lens element, a fourth lens element and a fifth lens element, all of which have refracting power. Through controlling a variable air gap formed between two adjacent lens elements and parameters to meet an inequality, adjustment distance required for focusing the optical imaging lens will be shortened.

19 Claims, 41 Drawing Sheets

(51) Int. Cl.
*G02B 27/00* (2006.01)
*H04N 5/225* (2006.01)

(56) References Cited

U.S. PATENT DOCUMENTS

| | | | |
|---|---|---|---|
| 2008/0198463 A1 | 8/2008 | Muratani | |
| 2008/0252996 A1* | 10/2008 | Kato | G02B 15/144111 |
| | | | 359/747 |
| 2010/0232040 A1* | 9/2010 | Iwasawa | G03B 3/02 |
| | | | 359/784 |
| 2018/0017767 A1 | 1/2018 | Chen | |
| 2018/0024315 A1* | 1/2018 | Sato | G02B 13/02 |
| | | | 359/601 |
| 2019/0025568 A1* | 1/2019 | Matsuura | G02B 23/243 |
| 2019/0324233 A1 | 10/2019 | Chen | |
| 2020/0096733 A1 | 3/2020 | Wang et al. | |
| 2020/0285032 A1 | 9/2020 | Jhang et al. | |
| 2020/0319429 A1 | 10/2020 | Chen | |
| 2020/0326504 A1* | 10/2020 | Ino | G02B 9/64 |

FOREIGN PATENT DOCUMENTS

| | | |
|---|---|---|
| CN | 107621687 A | 1/2018 |
| CN | 209182571 U | 7/2019 |
| CN | 110174747 A | 8/2019 |
| TW | I674449 B | 10/2019 |

OTHER PUBLICATIONS

Chinese Office Action, dated Apr. 6, 2021, and Search Report dated Mar. 26, 2021, in a counterpart Chinese patent application, No. CN 201911148096.5.

* cited by examiner

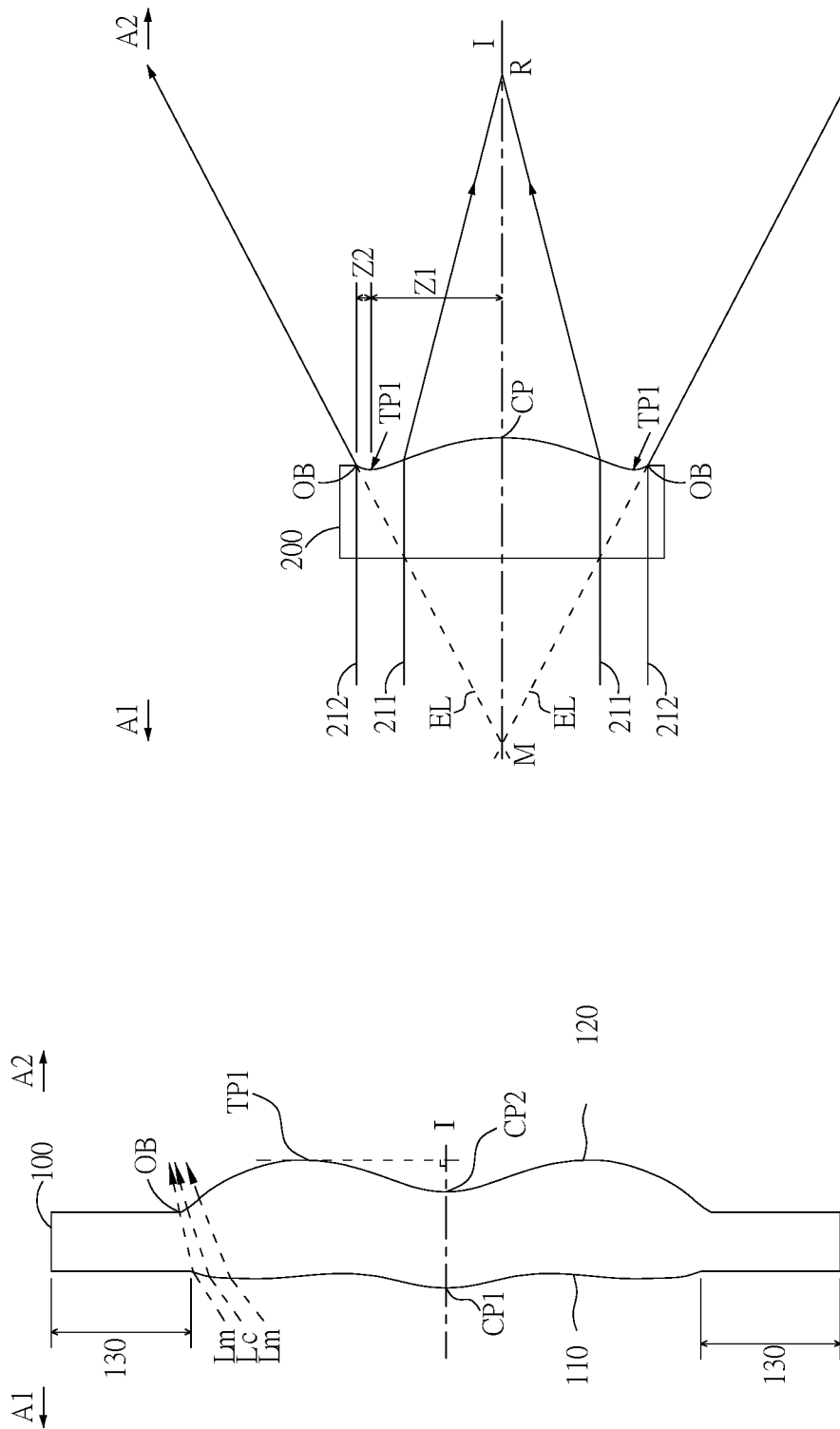

| Embodiment 1 ||||||||
| EFL = 16.601 mm；HFOV = 8.127 degrees；TTL = 15.678 mm ||||||||
| Fno = 3.475；Image Height = 2.398 mm；35 mm equivalent focal length = 149.878 mm ||||||||
| Surface # | | Radius (mm) | Thickness /air gap (mm) | Refractive index | Abbe number | Focal length (mm) | Material |
| --- | --- | --- | --- | --- | --- | --- | --- |
| OBJ | Object | INFINITY | INFINITY | | | | |
| STO | Aperture stop | INFINITY | -0.718 | | | | |
| L1A1 | 1st lens element | 4.294 | 1.737 | 1.545 | 55.987 | 13.089 | Plastic |
| L1A2 | | 9.213 | 1.057 | | | | |
| L2A1 | 2nd lens element | 30.656 | 0.347 | 1.642 | 22.409 | -10.797 | Plastic |
| L2A2 | | 5.666 | 0.059 | | | | |
| L3A1 | 3rd lens element | 4.284 | 2.090 | 1.545 | 55.987 | 8.878 | Plastic |
| L3A2 | | 30.407 | 1.386 | | | | |
| L4A1 | 4th lens element | 58.976 | 0.534 | 1.545 | 55.987 | -7.629 | Plastic |
| L4A2 | | 3.880 | 0.690 | | | | |
| L5A1 | 5th lens element | 10.622 | 1.169 | 1.642 | 22.409 | 15.281 | Plastic |
| L5A2 | | -137.634 | 4.613 | | | | |
| TFA1 | Filtering unit | INFINITY | 0.210 | 1.517 | 64.167 | | |
| TFA2 | | INFINITY | 1.787 | | | | |
| IMA | Image plane | INFINITY | | | | | |

FIG. 8

| Embodiment 1 |||||
|---|---|---|---|---|
| Aspherical Parameters |||||
| Surface # | K | $a_2$ | $a_4$ | $a_6$ |
| L1A1 | 0.000000E+00 | 0.000000E+00 | 3.633380E-04 | -1.094236E-04 |
| L1A2 | 0.000000E+00 | 0.000000E+00 | 2.570962E-04 | -1.772839E-04 |
| L2A1 | 0.000000E+00 | 0.000000E+00 | -3.105667E-03 | -8.137279E-05 |
| L2A2 | 0.000000E+00 | 0.000000E+00 | -1.262658E-03 | -2.055575E-03 |
| L3A1 | 0.000000E+00 | 0.000000E+00 | 1.259416E-03 | -2.141026E-03 |
| L3A2 | 0.000000E+00 | 0.000000E+00 | 2.884127E-03 | 5.629234E-04 |
| L4A1 | 0.000000E+00 | 0.000000E+00 | -1.113542E-02 | 7.519071E-03 |
| L4A2 | 0.000000E+00 | 0.000000E+00 | -2.109948E-02 | 1.057141E-02 |
| L5A1 | 0.000000E+00 | 0.000000E+00 | -1.295287E-02 | 1.098032E-03 |
| L5A2 | 0.000000E+00 | 0.000000E+00 | -7.115221E-03 | 6.449333E-06 |
| Surface # | $a_8$ | $a_{10}$ | $a_{12}$ | |
| L1A1 | 4.048303E-05 | -5.083205E-06 | 2.956196E-07 | |
| L1A2 | 8.056311E-05 | -1.257053E-05 | 7.134684E-07 | |
| L2A1 | 7.828663E-05 | -1.971061E-05 | 1.407160E-06 | |
| L2A2 | 6.480863E-04 | -8.512137E-05 | 3.938573E-06 | |
| L3A1 | 6.315468E-04 | -6.446002E-05 | 1.653045E-06 | |
| L3A2 | -4.105278E-05 | 3.087031E-05 | -4.428221E-06 | |
| L4A1 | -2.186316E-03 | 2.910785E-04 | -1.820052E-05 | |
| L4A2 | -2.833030E-03 | 2.890027E-04 | -1.545470E-05 | |
| L5A1 | -1.448600E-04 | -4.615770E-05 | -3.710171E-06 | |
| L5A2 | -6.597829E-05 | -7.023426E-06 | 1.067807E-06 | |

FIG. 9

| | Embodiment 1 | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200 | 1200 | 1200 |
| G34(mm) | 1.276 | 1.386 | 1.491 | 1.439 | 1.555 | 1.662 |
| Distance difference before and after adjustment of the adjustable air gap (mm) | -0.110 | | 0.105 | 0.053 | 0.169 | 0.276 |
| G5F(mm) | 4.723 | 4.613 | 4.507 | 4.559 | 4.444 | 4.337 |
| EFLA(mm) | 16.554 | | 16.645 | 16.310 | 16.351 | 16.392 |
| EFL/EFLA | 1.003 | | 0.997 | 1.018 | 1.015 | 1.013 |

FIG. 10

| Embodiment 2 | | | | | | | |
|---|---|---|---|---|---|---|---|
| EFL = 16.810 mm ; HFOV = 7.596 degrees ; TTL = 16.249 mm | | | | | | | |
| Fno = 3.473 ; Image Height = 2.250 mm ; 35 mm equivalent focal length = 161.746 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.745 | | | | |
| L1A1 | 1st lens element | 4.220 | 1.736 | 1.569 | 56.060 | 11.694 | Plastic |
| L1A2 | | 9.763 | 1.265 | | | | |
| L2A1 | 2nd lens element | 1038.988 | 0.485 | 1.642 | 22.409 | -9.494 | Plastic |
| L2A2 | | 6.108 | 0.515 | | | | |
| L3A1 | 3rd lens element | 4.434 | 2.139 | 1.545 | 55.987 | 6.449 | Plastic |
| L3A2 | | -14.228 | 0.661 | | | | |
| L4A1 | 4th lens element | -6.748 | 0.484 | 1.545 | 55.987 | -5.576 | Plastic |
| L4A2 | | 5.693 | 0.575 | | | | |
| L5A1 | 5th lens element | 20.256 | 1.391 | 1.642 | 22.409 | 17.397 | Plastic |
| L5A2 | | -24.678 | 5.000 | | | | |
| TFA1 | Filtering unit | INFINITY | 0.210 | 1.517 | 64.167 | | |
| TFA2 | | INFINITY | 1.789 | | | | |
| IMA | Image plane | INFINITY | | | | | |

FIG. 13

| Embodiment 2 |||||
| --- |||||
| Aspherical Parameters |||||
| Surface # | K | $a_2$ | $a_4$ | $a_6$ |
| L1A1 | 0.000000E+00 | 0.000000E+00 | 3.310643E-04 | -4.713077E-05 |
| L1A2 | 0.000000E+00 | 0.000000E+00 | 1.401214E-03 | -1.944610E-04 |
| L2A1 | 0.000000E+00 | 0.000000E+00 | -1.309803E-03 | -1.503467E-03 |
| L2A2 | 0.000000E+00 | 0.000000E+00 | -3.930777E-03 | -1.820145E-03 |
| L3A1 | 0.000000E+00 | 0.000000E+00 | -2.352037E-03 | -1.545954E-04 |
| L3A2 | 0.000000E+00 | 0.000000E+00 | 4.575205E-04 | 1.237775E-03 |
| L4A1 | 0.000000E+00 | 0.000000E+00 | -1.173174E-02 | 6.314533E-03 |
| L4A2 | 0.000000E+00 | 0.000000E+00 | -1.921451E-02 | 8.468826E-03 |
| L5A1 | 0.000000E+00 | 0.000000E+00 | -1.473004E-02 | 1.648354E-03 |
| L5A2 | 0.000000E+00 | 0.000000E+00 | -6.877041E-03 | 2.828129E-04 |
| Surface # | $a_8$ | $a_{10}$ | $a_{12}$ | |
| L1A1 | 2.985239E-05 | -3.260414E-06 | 2.917483E-07 | |
| L1A2 | 8.260874E-05 | -8.398141E-06 | 6.934784E-07 | |
| L2A1 | 4.008373E-04 | -5.873753E-05 | 2.848263E-06 | |
| L2A2 | 7.377900E-04 | -1.238022E-04 | 6.191600E-06 | |
| L3A1 | 5.028596E-04 | -7.460892E-05 | 3.399018E-06 | |
| L3A2 | 1.882231E-04 | -2.130922E-07 | -1.286259E-06 | |
| L4A1 | -1.875671E-03 | 1.500843E-04 | -4.020903E-06 | |
| L4A2 | -2.321908E-03 | 2.426538E-04 | -1.102345E-05 | |
| L5A1 | -3.281843E-05 | -7.339348E-06 | -4.736025E-06 | |
| L5A2 | -1.116212E-05 | 2.886812E-06 | -5.525757E-07 | |

FIG. 14

| | Embodiment 2 | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200 | 1200 | 1200 |
| G12(mm) | 1.260 | 1.265 | 1.299 | 1.140 | 1.155 | 1.177 |
| Distance difference before and after adjustment of the adjustable air gap (mm) | -0.005 | | 0.035 | -0.125 | -0.109 | -0.088 |
| G34(mm) | 0.665 | 0.661 | 0.626 | 0.785 | 0.770 | 0.748 |
| EFLA(mm) | 16.855 | | 16.808 | 16.540 | 16.529 | 16.498 |
| EFL/EFLA | 0.997 | | 1.000 | 1.016 | 1.017 | 1.019 |

FIG. 15

| Embodiment 3 | | | | | | | |
|---|---|---|---|---|---|---|---|
| EFL = 17.715 mm ; HFOV = 8.387 degrees ; TTL = 17.141 mm | | | | | | | |
| Fno = 3.475 ; Image Height = 2.557 mm ; 35 mm equivalent focal length = 149.990 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.852 | | | | |
| L1A1 | 1st lens element | 4.243 | 1.825 | 1.545 | 55.987 | 13.089 | Plastic |
| L1A2 | | 11.912 | 1.714 | | | | |
| L2A1 | 2nd lens element | 280.405 | 0.420 | 1.642 | 22.409 | -10.797 | Plastic |
| L2A2 | | 5.659 | 0.541 | | | | |
| L3A1 | 3rd lens element | 5.095 | 1.764 | 1.545 | 55.987 | 8.878 | Plastic |
| L3A2 | | -113.978 | 0.857 | | | | |
| L4A1 | 4th lens element | -6.438 | 0.656 | 1.545 | 55.987 | -7.629 | Plastic |
| L4A2 | | 19.828 | 0.970 | | | | |
| L5A1 | 5th lens element | 9.379 | 1.930 | 1.642 | 22.409 | 15.281 | Plastic |
| L5A2 | | 30.221 | 4.456 | | | | |
| TFA1 | Filtering unit | INFINITY | 0.210 | 1.517 | 64.167 | | |
| TFA2 | | INFINITY | 1.798 | | | | |
| IMA | Image plane | INFINITY | | | | | |

FIG. 18

| Embodiment 3 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -2.132755E-04 | 3.719201E-05 |
| L1A2 | 0.000000E+00 | 0.000000E+00 | -3.867175E-05 | 2.042466E-04 |
| L2A1 | 0.000000E+00 | 0.000000E+00 | -2.574301E-03 | -1.424836E-04 |
| L2A2 | 0.000000E+00 | 0.000000E+00 | -3.245558E-03 | -1.274394E-03 |
| L3A1 | 0.000000E+00 | 0.000000E+00 | -1.855278E-03 | -1.021473E-03 |
| L3A2 | 0.000000E+00 | 0.000000E+00 | 1.507045E-03 | 8.539619E-04 |
| L4A1 | 0.000000E+00 | 0.000000E+00 | 2.227049E-02 | -1.927333E-03 |
| L4A2 | 0.000000E+00 | 0.000000E+00 | 1.769592E-02 | -5.968620E-05 |
| L5A1 | 0.000000E+00 | 0.000000E+00 | -9.896877E-03 | 9.780598E-04 |
| L5A2 | 0.000000E+00 | 0.000000E+00 | -9.049321E-03 | 4.861486E-04 |
| Surface # | $a_8$ | $a_{10}$ | $a_{12}$ | |
| L1A1 | 1.839205E-06 | -7.419322E-07 | 7.307650E-08 | |
| L1A2 | -3.037685E-05 | 4.032740E-06 | -2.022329E-07 | |
| L2A1 | 2.797222E-04 | -4.580128E-05 | 2.166258E-06 | |
| L2A2 | 6.591399E-04 | -8.242410E-05 | 3.857134E-06 | |
| L3A1 | 3.051757E-04 | -1.842610E-05 | 3.628055E-07 | |
| L3A2 | -2.208441E-04 | 2.524786E-05 | -1.721998E-06 | |
| L4A1 | -7.541119E-04 | 1.785484E-04 | -1.716853E-05 | |
| L4A2 | -1.478186E-03 | 2.937054E-04 | -2.151697E-05 | |
| L5A1 | -3.915547E-04 | 3.964455E-05 | -2.856303E-06 | |
| L5A2 | -1.107042E-04 | 9.173516E-06 | -2.150169E-07 | |

FIG. 19

| Embodiment 3 | | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200 | 1200 | 1200 |
| G34(mm) | 0.797 | 0.857 | 0.911 | 0.901 | 0.963 | 1.020 |
| Distance difference before and after adjustment of the adjustable air gap (mm) | -0.060 | | 0.054 | 0.045 | 0.106 | 0.163 |
| EFLA(mm) | 17.590 | | 17.833 | 17.418 | 17.541 | 17.655 |
| EFL/EFLA | 1.007 | | 0.993 | 1.017 | 1.010 | 1.003 |

FIG. 20

| Embodiment 4 ||||||||
|---|---|---|---|---|---|---|---|
| EFL = 18.414 mm ; HFOV = 7.649 degrees ; TTL = 16.997 mm ||||||||
| Fno = 3.475 ; Image Height = 2.484 mm ; 35 mm equivalent focal length = 160.492 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.887 | | | | |
| L1A1 | 1st lens element | 4.267 | 1.334 | 1.545 | 55.987 | 9.901 | Plastic |
| L1A2 | | 17.982 | 0.542 | | | | |
| L2A1 | 2nd lens element | 42.953 | 0.348 | 1.642 | 22.409 | -12.999 | Plastic |
| L2A2 | | 7.014 | 0.663 | | | | |
| L3A1 | 3rd lens element | 4.265 | 1.452 | 1.545 | 55.987 | 6.458 | Plastic |
| L3A2 | | -17.957 | 0.180 | | | | |
| L4A1 | 4th lens element | -4.601 | 0.538 | 1.545 | 55.987 | -4.999 | Plastic |
| L4A2 | | 6.997 | 1.705 | | | | |
| L5A1 | 5th lens element | 14.023 | 1.272 | 1.642 | 22.409 | 34.510 | Plastic |
| L5A2 | | 36.324 | 4.128 | | | | |
| TFA1 | Filtering unit | INFINITY | 0.210 | 1.517 | 64.167 | | |
| TFA2 | | INFINITY | 4.624 | | | | |
| IMA | Image plane | INFINITY | | | | | |

FIG. 23

| Embodiment 4 ||||
|---|---|---|---|---|
| Aspherical Parameters |||||
| Surface # | K | $a_2$ | $a_4$ | $a_6$ |
| L1A1 | 0.000000E+00 | 0.000000E+00 | 5.604551E-05 | 8.213299E-05 |
| L1A2 | 0.000000E+00 | 0.000000E+00 | -2.624150E-04 | 2.376211E-04 |
| L2A1 | 0.000000E+00 | 0.000000E+00 | -2.748245E-03 | -1.432398E-04 |
| L2A2 | 0.000000E+00 | 0.000000E+00 | -3.505440E-03 | -1.009337E-03 |
| L3A1 | 0.000000E+00 | 0.000000E+00 | -1.397191E-03 | -1.452169E-03 |
| L3A2 | 0.000000E+00 | 0.000000E+00 | -6.824878E-04 | 3.748283E-04 |
| L4A1 | 0.000000E+00 | 0.000000E+00 | 2.181695E-02 | -1.172208E-03 |
| L4A2 | 0.000000E+00 | 0.000000E+00 | 2.139424E-02 | 1.243782E-04 |
| L5A1 | 0.000000E+00 | 0.000000E+00 | -8.041041E-03 | 6.885101E-04 |
| L5A2 | 0.000000E+00 | 0.000000E+00 | -6.283597E-03 | 2.645105E-04 |
| Surface # | $a_8$ | $a_{10}$ | $a_{12}$ | |
| L1A1 | 1.156955E-06 | -7.700754E-07 | 3.458249E-08 | |
| L1A2 | -3.225560E-05 | 2.613488E-06 | -5.726206E-08 | |
| L2A1 | 2.892152E-04 | -4.091746E-05 | 2.012011E-06 | |
| L2A2 | 6.470999E-04 | -8.615959E-05 | 4.392248E-06 | |
| L3A1 | 2.648697E-04 | -1.676711E-05 | -5.417762E-07 | |
| L3A2 | -2.163312E-04 | 5.168203E-05 | -5.542259E-06 | |
| L4A1 | -6.025542E-04 | 1.687579E-04 | -1.461813E-05 | |
| L4A2 | -1.193527E-03 | 2.900055E-04 | -2.540947E-05 | |
| L5A1 | -2.696093E-04 | 3.341073E-05 | -3.575472E-06 | |
| L5A2 | -1.116320E-04 | 1.060290E-05 | -5.258645E-07 | |

FIG. 24

| Embodiment 4 | | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200 | 1200 | 1200 |
| G34(mm) | 0.163 | 0.180 | 0.195 | 0.192 | 0.209 | 0.225 |
| Distance difference before and after adjustment of the adjustable air gap (mm) | -0.017 | | 0.015 | 0.012 | 0.029 | 0.045 |
| EFLA(mm) | 18.322 | | 18.505 | 18.069 | 18.159 | 18.247 |
| EFL/EFLA | 1.005 | | 0.995 | 1.019 | 1.014 | 1.009 |

FIG. 25

| Embodiment 5 ||||||||
| :---: | :---: | :---: | :---: | :---: | :---: | :---: | :---: |
| EFL = 31.199 mm ; HFOV = 4.124 degrees ; TTL = 29.098 mm ||||||||
| Fno = 3.480 ; Image Height = 2.250 mm ; 35 mm equivalent focal length = 300.201 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -1.614 | | | | |
| L1A1 | 1st lens element | 6.998 | 2.954 | 1.545 | 55.987 | 13.089 | Plastic |
| L1A2 | | 34.588 | 1.751 | | | | |
| L2A1 | 2nd lens element | 123.398 | 0.332 | 1.642 | 22.409 | -10.797 | Plastic |
| L2A2 | | 8.058 | 0.974 | | | | |
| L3A1 | 3rd lens element | 7.695 | 2.918 | 1.545 | 55.987 | 8.878 | Plastic |
| L3A2 | | -739.340 | 0.252 | | | | |
| L4A1 | 4th lens element | -8.493 | 0.826 | 1.545 | 55.987 | -7.629 | Plastic |
| L4A2 | | 18.785 | 0.796 | | | | |
| L5A1 | 5th lens element | 10.476 | 3.050 | 1.642 | 22.409 | 15.281 | Plastic |
| L5A2 | | 30.905 | 10.102 | | | | |
| TFA1 | Filtering unit | INFINITY | 0.210 | 1.517 | 64.167 | | |
| TFA2 | | INFINITY | 4.933 | | | | |
| IMA | Image plane | INFINITY | | | | | |

FIG. 28

| Embodiment 5 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -4.755229E-05 | 3.227167E-06 |
| L1A2 | 0.000000E+00 | 0.000000E+00 | 6.299210E-05 | 3.829202E-05 |
| L2A1 | 0.000000E+00 | 0.000000E+00 | -7.148127E-04 | -1.814942E-05 |
| L2A2 | 0.000000E+00 | 0.000000E+00 | -1.128890E-03 | -2.007113E-04 |
| L3A1 | 0.000000E+00 | 0.000000E+00 | -1.992084E-04 | -1.480723E-04 |
| L3A2 | 0.000000E+00 | 0.000000E+00 | 2.938513E-04 | 1.044762E-04 |
| L4A1 | 0.000000E+00 | 0.000000E+00 | 7.268221E-03 | -3.046612E-04 |
| L4A2 | 0.000000E+00 | 0.000000E+00 | 6.298555E-03 | 5.971782E-05 |
| L5A1 | 0.000000E+00 | 0.000000E+00 | -2.055423E-03 | 1.918460E-04 |
| L5A2 | 0.000000E+00 | 0.000000E+00 | -1.423556E-03 | 2.751163E-05 |
| Surface # | $a_8$ | $a_{10}$ | $a_{12}$ | |
| L1A1 | 3.033792E-07 | -1.942728E-08 | 1.077253E-09 | |
| L1A2 | -2.352540E-06 | 1.455166E-07 | -1.885428E-09 | |
| L2A1 | 2.211606E-05 | -1.707406E-06 | 3.689459E-08 | |
| L2A2 | 5.132347E-05 | -3.248731E-06 | 5.252904E-08 | |
| L3A1 | 2.267953E-05 | -9.083662E-07 | -2.151481E-08 | |
| L3A2 | -1.861861E-05 | 8.547605E-07 | -3.269516E-08 | |
| L4A1 | -5.326354E-05 | 8.697814E-06 | -3.429740E-07 | |
| L4A2 | -1.044174E-04 | 1.030805E-05 | -4.303690E-07 | |
| L5A1 | -3.367673E-05 | 4.287430E-07 | -1.687166E-07 | |
| L5A2 | -1.155897E-05 | 1.180829E-07 | 2.108535E-08 | |

FIG. 29

| Embodiment 5 | | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200 | 1200 | 1200 |
| G12(mm) | 1.686 | 1.751 | 1.816 | 1.869 | 1.941 | 2.007 |
| Distance difference before and after adjustment of the adjustable air gap (mm) | -0.065 | | 0.066 | 0.118 | 0.190 | 0.256 |
| EFLA(mm) | 30.993 | | 31.382 | 30.441 | 30.593 | 30.779 |
| EFL/EFLA | 1.007 | | 0.994 | 1.025 | 1.020 | 1.014 |

FIG. 30

| Embodiment 6 | | | | | | | |
|---|---|---|---|---|---|---|---|
| EFL = 16.594 mm ; HFOV = 8.401 degrees ; TTL = 29.654 mm | | | | | | | |
| Fno = 3.480 ; Image Height = 2.250 mm ; 35 mm equivalent focal length = 150.053 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 21.477 | 0.499 | 1.642 | 22.409 | -146.416 | Plastic |
| L1A2 | | 17.349 | 0.200 | | | | |
| STO | Aperture stop | INFINITY | 1.190 | | | | |
| L2A1 | 2nd lens element | 241.564 | 0.987 | 1.545 | 55.987 | 20.465 | Plastic |
| L2A2 | | -11.705 | 1.761 | | | | |
| L3A1 | 3rd lens element | -10.188 | 10.818 | 1.545 | 55.987 | 9.468 | Plastic |
| L3A2 | | -4.718 | 0.080 | | | | |
| L4A1 | 4th lens element | 26.002 | 2.186 | 1.642 | 22.409 | -15.935 | Plastic |
| L4A2 | | 7.141 | 0.895 | | | | |
| L5A1 | 5th lens element | 5.143 | 1.841 | 1.545 | 55.987 | -325.339 | Plastic |
| L5A2 | | 4.367 | 4.836 | | | | |
| TFA1 | Filtering unit | INFINITY | 0.210 | 1.517 | 64.167 | | |
| TFA2 | | INFINITY | 4.151 | | | | |
| IMA | Image plane | INFINITY | | | | | |

FIG. 33

| Embodiment 6 | | | | | |
|---|---|---|---|---|---|
| Aspherical Parameters | | | | | |
| Surface # | K | $a_2$ | $a_4$ | $a_6$ | $a_8$ |
| L1A1 | -7.433272E+00 | 0.000000E+00 | 5.841568E-04 | -1.668305E-05 | -5.504056E-06 |
| L1A2 | 4.129227E+00 | 0.000000E+00 | 1.226344E-03 | -8.768372E-06 | -2.430022E-06 |
| L2A1 | 7.621517E+03 | 0.000000E+00 | -3.551093E-05 | -2.574756E-06 | 9.791526E-07 |
| L2A2 | 6.547525E+00 | 0.000000E+00 | -1.267815E-04 | -6.586520E-06 | -1.531988E-06 |
| L3A1 | -8.308763E-01 | 0.000000E+00 | -2.950984E-05 | -5.018522E-05 | -3.484021E-06 |
| L3A2 | -8.000674E-01 | 0.000000E+00 | 7.361440E-04 | -3.288085E-05 | 8.723861E-07 |
| L4A1 | -2.260177E+02 | 0.000000E+00 | -4.676707E-04 | -2.738904E-05 | -6.729305E-07 |
| L4A2 | -2.595982E+01 | 0.000000E+00 | 1.261360E-03 | -1.889442E-07 | -2.980759E-06 |
| L5A1 | -1.182629E+01 | 0.000000E+00 | -1.514091E-04 | 9.297044E-05 | 5.692335E-07 |
| L5A2 | -6.720014E+00 | 0.000000E+00 | -1.556625E-03 | -7.949013E-06 | 3.635113E-06 |
| Surface # | $a_{10}$ | $a_{12}$ | $a_{14}$ | $a_{16}$ | |
| L1A1 | -5.519146E-07 | -4.241569E-09 | 0.000000E+00 | 0.000000E+00 | |
| L1A2 | -8.838602E-07 | -5.615458E-08 | 0.000000E+00 | 0.000000E+00 | |
| L2A1 | -3.880889E-07 | -2.588578E-08 | 0.000000E+00 | 0.000000E+00 | |
| L2A2 | 1.008060E-07 | 2.844348E-08 | 0.000000E+00 | 0.000000E+00 | |
| L3A1 | 6.497182E-07 | 0.000000E+00 | 0.000000E+00 | 0.000000E+00 | |
| L3A2 | 2.333278E-09 | 0.000000E+00 | 0.000000E+00 | 0.000000E+00 | |
| L4A1 | -6.841502E-08 | -5.158040E-09 | 6.561160E-10 | -2.351000E-12 | |
| L4A2 | -8.625848E-08 | -2.802812E-08 | -1.730733E-09 | 2.038720E-10 | |
| L5A1 | -3.857113E-07 | -2.133725E-08 | 8.841800E-10 | -1.487520E-10 | |
| L5A2 | 3.478507E-07 | -2.461166E-08 | -6.432403E-09 | 2.813430E-10 | |

FIG. 34

| Embodiment 6 | | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200 | 1200 | 1200 |
| G23(mm) | 1.428 | 1.761 | 2.068 | 1.894 | 2.234 | 2.547 |
| Distance difference before and after adjustment of the adjustable air gap (mm) | -0.333 | | 0.307 | 0.133 | 0.473 | 0.786 |
| EFLA(mm) | 15.297 | | 15.870 | 15.459 | 15.761 | 16.040 |
| EFL/EFLA | 1.019 | | 0.983 | 1.009 | 0.989 | 0.972 |

FIG. 35

| Embodiment 7 ||||||||
|---|---|---|---|---|---|---|---|
| EFL = 15.629 mm ; HFOV = 8.384 degrees ; TTL = 29.690 mm ||||||||
| Fno = 3.480 ; Image Height = 2.250 mm ; 35 mm equivalent focal length = 150.126 mm ||||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 21.477 | 0.499 | 1.642 | 22.409 | -146.416 | Plastic |
| L1A2 | | 17.349 | 0.200 | | | | |
| STO | Aperture stop | INFINITY | 1.190 | | | | |
| L2A1 | 2nd lens element | 241.564 | 0.987 | 1.545 | 55.987 | 20.465 | Plastic |
| L2A2 | | -11.705 | 1.761 | | | | |
| L3A1 | 3rd lens element | -10.188 | 10.818 | 1.545 | 55.987 | 9.468 | Plastic |
| L3A2 | | -4.718 | 0.062 | | | | |
| L4A1 | 4th lens element | 26.002 | 2.186 | 1.642 | 22.409 | -15.935 | Plastic |
| L4A2 | | 7.141 | 0.895 | | | | |
| L5A1 | 5th lens element | 5.143 | 1.841 | 1.545 | 55.987 | -325.339 | Plastic |
| L5A2 | | 4.367 | 4.836 | | | | |
| TFA1 | Filtering unit | INFINITY | 0.210 | 1.517 | 64.167 | | |
| TFA2 | | INFINITY | 4.204 | | | | |
| IMA | Image plane | INFINITY | | | | | |

FIG. 38

| Embodiment 7 | | | | | |
|---|---|---|---|---|---|
| Aspherical Parameters | | | | | |
| Surface # | K | $a_2$ | $a_4$ | $a_6$ | $a_8$ |
| L1A1 | -7.433272E+00 | 0.000000E+00 | 5.841568E-04 | -1.668305E-05 | -5.504056E-06 |
| L1A2 | 4.129227E+00 | 0.000000E+00 | 1.226344E-03 | -8.768372E-06 | -2.430022E-06 |
| L2A1 | 7.621517E+03 | 0.000000E+00 | -3.551093E-05 | -2.574756E-06 | 9.791526E-07 |
| L2A2 | 6.547525E+00 | 0.000000E+00 | -1.267815E-04 | -6.586520E-06 | -1.531988E-06 |
| L3A1 | -8.308763E-01 | 0.000000E+00 | -2.950984E-05 | -5.018522E-05 | -3.484021E-06 |
| L3A2 | -8.000674E-01 | 0.000000E+00 | 7.361440E-04 | -3.288085E-05 | 8.723861E-07 |
| L4A1 | -2.260177E+02 | 0.000000E+00 | -4.676707E-04 | -2.738904E-05 | -6.729305E-07 |
| L4A2 | -2.595982E+01 | 0.000000E+00 | 1.261360E-03 | -1.889442E-07 | -2.980759E-06 |
| L5A1 | -1.182629E+01 | 0.000000E+00 | -1.514091E-04 | 9.297044E-05 | 5.692335E-07 |
| L5A2 | -6.720014E+00 | 0.000000E+00 | -1.556625E-03 | -7.949013E-06 | 3.635113E-06 |
| Surface # | $a_{10}$ | $a_{12}$ | $a_{14}$ | $a_{16}$ | |
| L1A1 | -5.519146E-07 | -4.241569E-09 | 0.000000E+00 | 0.000000E+00 | |
| L1A2 | -8.838602E-07 | -5.615458E-08 | 0.000000E+00 | 0.000000E+00 | |
| L2A1 | -3.880889E-07 | -2.588578E-08 | 0.000000E+00 | 0.000000E+00 | |
| L2A2 | 1.008060E-07 | 2.844348E-08 | 0.000000E+00 | 0.000000E+00 | |
| L3A1 | 6.497182E-07 | 0.000000E+00 | 0.000000E+00 | 0.000000E+00 | |
| L3A2 | 2.333278E-09 | 0.000000E+00 | 0.000000E+00 | 0.000000E+00 | |
| L4A1 | -6.841502E-08 | -5.158040E-09 | 6.561160E-10 | -2.351000E-12 | |
| L4A2 | -8.625848E-08 | -2.802812E-08 | -1.730733E-09 | 2.038720E-10 | |
| L5A1 | -3.857113E-07 | -2.133725E-08 | 8.841800E-10 | -1.487520E-10 | |
| L5A2 | 3.478507E-07 | -2.461166E-08 | -6.432403E-09 | 2.813430E-10 | |

FIG. 39

| | Embodiment 7 | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200 | 1200 | 1200 |
| G34(mm) | 0.012 | 0.062 | 0.110 | 0.078 | 0.130 | 0.180 |
| Distance difference before and after adjustment of the adjustable air gap (mm) | -0.050 | | 0.048 | 0.016 | 0.069 | 0.118 |
| EFLA(mm) | 15.541 | | 15.708 | 15.412 | 15.497 | 15.574 |
| EFL/EFLA | 1.006 | | 0.995 | 1.014 | 1.009 | 1.004 |

FIG. 40

| Embodiment 8 | | | | | | | |
|---|---|---|---|---|---|---|---|
| EFL = 27.261 mm ; HFOV = 5.583 degrees ; TTL = 30.933 mm | | | | | | | |
| Fno = 3.480 ; Image Height = 2.500 mm ; 35 mm equivalent focal length = 236.121 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.746 | | | | |
| L1A1 | 1st lens element | 10.055 | 3.229 | 1.545 | 55.987 | 20.241 | Plastic |
| L1A2 | | 98.313 | 1.509 | | | | |
| L2A1 | 2nd lens element | -118.308 | 0.837 | 1.642 | 22.409 | -47.653 | Plastic |
| L2A2 | | 41.842 | 0.941 | | | | |
| L3A1 | 3rd lens element | 29.995 | 0.458 | 1.642 | 22.409 | -61.856 | Plastic |
| L3A2 | | 17.046 | 0.290 | | | | |
| L4A1 | 4th lens element | 57.178 | 2.745 | 1.545 | 55.987 | 77.340 | Plastic |
| L4A2 | | -159.063 | 9.257 | | | | |
| L5A1 | 5th lens element | -165.466 | 1.521 | 1.545 | 55.987 | 21.338 | Plastic |
| L5A2 | | -10.925 | 2.421 | | | | |
| L6A1 | 6th lens element | -37.598 | 2.050 | 1.531 | 55.745 | -19.448 | Plastic |
| L6A2 | | 14.596 | 3.048 | | | | |
| TFA1 | Filtering unit | INFINITY | 0.210 | 1.517 | 64.167 | | |
| TFA2 | | INFINITY | 2.417 | | | | |
| IMA | Image plane | INFINITY | | | | | |

FIG. 43

| Embodiment 8 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -5.336331E-05 | 1.370964E-06 |
| L1A2 | 0.000000E+00 | 0.000000E+00 | -1.457550E-04 | 9.775506E-06 |
| L2A1 | 0.000000E+00 | 0.000000E+00 | -1.590138E-04 | 1.537032E-05 |
| L2A2 | 0.000000E+00 | 0.000000E+00 | -6.255679E-05 | 1.796818E-05 |
| L3A1 | -7.327845E+00 | 0.000000E+00 | -6.177764E-04 | 1.954406E-05 |
| L3A2 | -1.009955E+01 | 0.000000E+00 | -4.707584E-04 | 1.437322E-05 |
| L4A1 | 0.000000E+00 | 0.000000E+00 | -5.045709E-04 | 1.296612E-05 |
| L4A2 | 0.000000E+00 | 0.000000E+00 | -6.278551E-04 | 5.643694E-06 |
| L5A1 | 0.000000E+00 | 0.000000E+00 | -5.751700E-04 | 9.232101E-06 |
| L5A2 | -4.294061E-01 | 0.000000E+00 | 1.574590E-03 | 3.631514E-05 |
| L6A1 | -1.458382E+01 | 0.000000E+00 | 7.959272E-04 | -2.834375E-05 |
| L6A2 | -1.161806E+01 | 0.000000E+00 | -3.536842E-03 | 3.944913E-05 |
| Surface # | $a_8$ | $a_{10}$ | $a_{12}$ | $a_{14}$ |
| L1A1 | -6.321793E-08 | 6.147332E-09 | -1.358200E-11 | 9.599000E-12 |
| L1A2 | -1.375961E-07 | 1.272781E-08 | 3.928970E-10 | 4.978000E-12 |
| L2A1 | -3.048210E-07 | 1.253230E-08 | 2.833300E-10 | 1.248000E-11 |
| L2A2 | -8.310901E-07 | 1.847228E-08 | -1.091820E-09 | 6.082400E-11 |
| L3A1 | -9.032539E-07 | 2.448361E-08 | -4.820660E-10 | -1.908510E-10 |
| L3A2 | -7.936989E-07 | -2.111532E-08 | -2.252907E-09 | -1.833590E-10 |
| L4A1 | -2.475772E-07 | -3.031026E-08 | -4.046875E-09 | -1.823520E-10 |
| L4A2 | 4.065080E-07 | 2.882371E-08 | -2.374536E-09 | -3.901670E-10 |
| L5A1 | 3.110810E-06 | -4.435083E-09 | -1.387955E-08 | -1.342748E-09 |
| L5A2 | -4.737444E-07 | 7.979036E-08 | 6.409329E-09 | -1.987110E-10 |
| L6A1 | -8.598828E-07 | 2.863178E-08 | 1.113522E-08 | 1.197567E-09 |
| L6A2 | 1.343435E-06 | -1.066553E-07 | -3.202665E-09 | 7.401460E-10 |
| Surface # | $a_{16}$ | $a_{18}$ | $a_{20}$ | |
| L1A1 | -8.620000E-13 | | | |
| L1A2 | -4.302000E-12 | | | |
| L2A1 | -2.575000E-12 | | | |
| L2A2 | 8.509000E-12 | | | |
| L3A1 | -1.090300E-11 | | | |
| L3A2 | -7.612000E-12 | | | |
| L4A1 | -7.600000E-13 | 2.279000E-12 | 0.000000E+00 | |
| L4A2 | -1.632600E-11 | 3.163000E-12 | 0.000000E+00 | |
| L5A1 | -5.659000E-11 | 4.740000E-13 | 3.210000E-13 | |
| L5A2 | -7.544500E-11 | -5.695000E-12 | 4.820000E-13 | |
| L6A1 | 1.565500E-10 | 6.870000E-12 | -1.248000E-12 | |
| L6A2 | 1.305330E-10 | 9.111000E-12 | -4.480000E-13 | |

FIG. 44

| | Embodiment 8 | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200 | 1200 | 1200 |
| G12(mm) | 1.393 | 1.509 | 1.618 | 1.709 | 1.831 | 1.946 |
| Distance difference before and after adjustment of the adjustable air gap (mm) | -0.116 | | 0.109 | 0.200 | 0.321 | 0.437 |
| EFLA(mm) | 27.052 | | 27.462 | 26.779 | 26.984 | 27.181 |
| EFL/EFLA | 1.008 | | 0.993 | 1.018 | 1.010 | 1.003 |

FIG. 45

| Embodiment 9 ||||||||
|---|---|---|---|---|---|---|---|
| EFL = 30.149 mm ; HFOV = 4.968 degrees ; TTL = 38.272 mm ||||||||
| Fno = 3.480 ; Image Height = 2.497 mm ; 35 mm equivalent focal length = 261.369 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.710 | | | | |
| L1A1 | 1st lens element | 12.234 | 4.409 | 1.545 | 55.987 | 27.410 | Plastic |
| L1A2 | | 58.355 | 0.299 | | | | |
| L2A1 | 2nd lens element | 86.284 | 2.214 | 1.545 | 55.987 | -1028.007 | Plastic |
| L2A2 | | 74.114 | 0.216 | | | | |
| L3A1 | 3rd lens element | 48.634 | 0.970 | 1.661 | 20.373 | -83.948 | Plastic |
| L3A2 | | 25.822 | 0.111 | | | | |
| L4A1 | 4th lens element | 31.716 | 2.762 | 1.545 | 55.987 | 76.373 | Plastic |
| L4A2 | | 128.191 | 1.017 | | | | |
| L5A1 | 5th lens element | 98.450 | 2.466 | 1.661 | 20.373 | -44.292 | Plastic |
| L5A2 | | 22.499 | 3.208 | | | | |
| L6A1 | 6th lens element | 50.479 | 12.087 | 1.545 | 55.987 | 15.199 | Plastic |
| L6A2 | | -9.096 | 1.647 | | | | |
| L7A1 | 7th lens element | -12.144 | 2.289 | 1.545 | 55.987 | -13.217 | Plastic |
| L7A2 | | 18.994 | 1.963 | | | | |
| TFA1 | Filtering unit | INFINITY | 0.210 | 1.517 | 64.167 | | |
| TFA2 | | INFINITY | 2.405 | | | | |
| IMA | Image plane | INFINITY | | | | | |

FIG. 48

| Embodiment 9 ||||
|---|---|---|---|
| Aspherical Parameters ||||
| Surface # | K | $a_2$ | $a_4$ | $a_6$ |
| L1A1 | -9.304060E-02 | 0.000000E+00 | -3.625200E-05 | -9.767337E-07 |
| L1A2 | 3.354032E+01 | 0.000000E+00 | -1.074900E-04 | 5.324544E-06 |
| L2A1 | 3.757783E+00 | 0.000000E+00 | -6.360969E-05 | 5.143644E-06 |
| L2A2 | 7.055377E+01 | 0.000000E+00 | -1.975123E-04 | 9.027906E-06 |
| L3A1 | 1.423216E+00 | 0.000000E+00 | -3.502260E-04 | 8.189548E-06 |
| L3A2 | -1.317554E+00 | 0.000000E+00 | -1.818517E-04 | -3.835629E-06 |
| L4A1 | -4.458372E+00 | 0.000000E+00 | 5.504745E-05 | 3.045740E-06 |
| L4A2 | 6.194173E+02 | 0.000000E+00 | -1.376968E-04 | 8.923467E-06 |
| L5A1 | 1.681266E+02 | 0.000000E+00 | -1.307391E-04 | -5.905509E-06 |
| L5A2 | -2.777848E+01 | 0.000000E+00 | -1.151001E-04 | -1.148256E-05 |
| L6A1 | -4.662407E+02 | 0.000000E+00 | -4.629372E-04 | -2.088140E-05 |
| L6A2 | -7.344146E-01 | 0.000000E+00 | -2.976643E-04 | 8.504402E-06 |
| L7A1 | 1.124551E+01 | 0.000000E+00 | -1.553401E-03 | -1.930715E-05 |
| L7A2 | -7.501793E+01 | 0.000000E+00 | -2.848442E-03 | -5.919094E-05 |
| Surface # | $a_8$ | $a_{10}$ | $a_{12}$ | $a_{14}$ |
| L1A1 | 2.597674E-08 | -2.042344E-09 | 1.030000E-13 | -7.820000E-12 |
| L1A2 | -1.988907E-07 | -3.565443E-09 | -1.246840E-10 | -3.744200E-11 |
| L2A1 | -1.605275E-07 | 1.507534E-08 | 8.432040E-10 | 4.585500E-11 |
| L2A2 | 3.485723E-08 | 3.640526E-08 | 3.786787E-09 | 1.130720E-10 |
| L3A1 | -4.349296E-07 | 5.286330E-09 | -1.376902E-09 | -2.036760E-10 |
| L3A2 | -3.611625E-07 | -2.892486E-08 | -1.740060E-09 | -9.306100E-11 |
| L4A1 | 3.451985E-07 | 2.566848E-08 | 2.113075E-09 | 1.129600E-10 |
| L4A2 | 5.579261E-07 | 3.132938E-08 | -3.628089E-09 | -2.595290E-10 |
| L5A1 | 2.153890E-07 | -1.146243E-07 | -6.010530E-09 | 8.790100E-11 |
| L5A2 | -5.181349E-07 | -5.151088E-09 | -8.070765E-09 | -8.174450E-10 |
| L6A1 | -5.160655E-07 | 4.186435E-08 | 1.141991E-08 | 6.193570E-10 |
| L6A2 | -3.181967E-06 | 4.588914E-07 | 5.337870E-08 | 2.714700E-09 |
| L7A1 | 1.680326E-05 | 1.357306E-06 | 7.484030E-08 | -1.609425E-09 |
| L7A2 | 6.832353E-06 | 8.840022E-07 | 1.670748E-08 | -3.627702E-09 |
| Surface # | $a_{16}$ | $a_{18}$ | $a_{20}$ | |
| L1A1 | 2.120000E-13 | | | |
| L1A2 | 1.788000E-12 | | | |
| L2A1 | -3.703000E-12 | | | |
| L2A2 | -1.752900E-11 | | | |
| L3A1 | -6.420000E-13 | | | |
| L3A2 | 1.803000E-12 | | | |
| L4A1 | -1.308800E-11 | | | |
| L4A2 | -2.024200E-11 | -7.770000E-13 | 1.470000E-13 | |
| L5A1 | -3.096500E-11 | | | |
| L5A2 | 1.017650E-10 | | | |
| L6A1 | -3.302300E-11 | | | |
| L6A2 | -3.955090E-10 | | | |
| L7A1 | -7.091330E-10 | | | |
| L7A2 | -2.693940E-10 | | | |

FIG. 49

| | Embodiment 9 | | | | | |
|---|---|---|---|---|---|---|
| Temperature (°C) | -20 | 20 | 60 | -20 | 20 | 60 |
| Distance between an object and the object-side surface of the first lens element along the optical axis (mm) | INFINITY | INFINITY | INFINITY | 1200mm | 1200mm | 1200mm |
| G67(mm) | 1.550 | 1.647 | 1.757 | 1.919 | 2.020 | 2.133 |
| Distance difference before and after adjustment of the adjustable air gap (mm) | -0.097 | | 0.110 | 0.272 | 0.373 | 0.486 |
| EFLA(mm) | 30.089 | | 30.210 | 28.937 | 28.996 | 29.061 |
| EFL/EFLA | 1.002 | | 0.998 | 1.042 | 1.040 | 1.037 |

FIG. 50

| Embodiment | 1st | 2nd | 3rd | 4th | 5th | 6th | 7th | 8th | 9th |
|---|---|---|---|---|---|---|---|---|---|
| fG | 10.906 | 8.344 | 11.299 | 6.281 | 13.089 | 23.666 | 9.423 | 20.241 | 21.421 |
| 35 mm equivalent focal length | 149.878 | 161.746 | 149.990 | 160.492 | 300.201 | 150.053 | 150.126 | 236.121 | 261.369 |
| BFL | 6.610 | 6.999 | 6.464 | 8.962 | 15.245 | 9.197 | 9.208 | 10.146 | 23.809 |
| ALT | 5.877 | 6.234 | 6.594 | 4.945 | 10.080 | 16.033 | 16.033 | 8.789 | 12.821 |
| AAG | 3.191 | 3.015 | 4.082 | 3.091 | 3.773 | 3.925 | 3.921 | 11.997 | 1.642 |
| TL | 9.068 | 9.249 | 10.676 | 8.036 | 13.854 | 19.958 | 19.954 | 20.786 | 14.463 |
| TTL | 15.678 | 16.249 | 17.141 | 16.997 | 29.098 | 29.155 | 29.162 | 30.933 | 38.272 |
| EFL/ImgH | 6.923 | 7.471 | 6.928 | 7.413 | 13.866 | 6.931 | 6.934 | 10.906 | 12.072 |
| TTL/ImgH | 6.538 | 7.222 | 6.703 | 6.843 | 12.933 | 12.958 | 12.961 | 12.375 | 15.325 |
| HFOV/ImgH | 3.389 | 3.376 | 3.280 | 3.079 | 1.833 | 3.734 | 3.732 | 2.233 | 1.989 |
| EFL/fG | 1.522 | 2.015 | 1.568 | 2.932 | 2.384 | 0.659 | 1.656 | 1.347 | 1.407 |
| EFL/(Fno*ImgH) | 1.992 | 2.151 | 1.994 | 2.133 | 3.985 | 1.992 | 1.993 | 3.134 | 3.469 |
| HFOV | 8.127 | 7.596 | 8.387 | 7.649 | 4.124 | 8.401 | 8.397 | 5.583 | 4.968 |
| EFL/BFL | 2.511 | 2.402 | 2.740 | 2.055 | 2.047 | 1.696 | 1.694 | 2.687 | 1.266 |
| TTL/TL | 1.729 | 1.757 | 1.605 | 2.115 | 2.100 | 1.461 | 1.461 | 1.488 | 2.646 |
| TTL/T1 | 9.025 | 9.362 | 9.394 | 12.741 | 9.852 | 145.560 | 145.597 | 9.581 | 8.681 |
| TTL/(T2+G23+T3) | 6.283 | 5.176 | 6.290 | 6.898 | 6.887 | 2.149 | 2.150 | 13.836 | 11.256 |
| ALT/AAG | 1.842 | 2.068 | 1.615 | 1.600 | 2.671 | 4.084 | 4.088 | 0.733 | 7.807 |
| (T1+G12+T3+G34)/(T4+G45+T5) | 2.620 | 2.368 | 1.732 | 0.998 | 1.685 | 2.497 | 2.496 | 0.406 | 0.927 |
| (G23+T3+G34)/(T1+T2) | 1.696 | 1.493 | 1.408 | 1.365 | 1.261 | 10.658 | 10.655 | 0.415 | 0.196 |
| (T4+G45+T5)/(T1+T2) | 1.148 | 1.103 | 1.584 | 2.090 | 1.422 | 4.144 | 4.144 | 3.326 | 0.943 |
| (T1+G12+T2+T4+G45+T5)/(G23+T3+G34) | 1.566 | 1.790 | 2.377 | 2.500 | 2.343 | 0.577 | 0.577 | 11.307 | 10.152 |

FIG. 51

OPTICAL IMAGING LENS

TECHNICAL FIELD

The present disclosure relates to optical imaging lenses, and particularly, optical imaging lenses having, in some embodiments, applied in mobile electronic devices.

BACKGROUND

Recently, as the specifications of mobile electronic devices evolve rapidly, key elements therein, such as optical imaging lenses develop different varieties. They may be applied in not only video filming and picture taking, but telephoto shooting. In the last one, they have to provide optical zooming function along with wide-angle lens. On demands of high magnification of the optical zooming function of mobile electronic devices in the market, longer focal length of a telephoto lens is required.

A wide-angle lens, the 35 mm equivalent focal length of which is 26 mm, and a telephoto lens, the 35 mm equivalent focal length of which is 52 mm, are mounted as typical duo-lenses in mobile electronic devices now. As such, 2× magnification may be provided. A distance between a telephoto lens and an imaging plane has to be adjusted by an actuator to focus with a well-adjusted image distance to shot an object the position of which may vary across the full range the telephoto lens may shot, i.e. from infinity to 1.200 m.

Based on the thin lens equation, the distance between the telephoto lens and the imaging plane, adjusted by the actuator, may be increased non-linearly along with the increasing of the focal length, within the full range the telephoto lens may shot, i.e. from infinity to 1.200 m. For example, the adjusted distance of a telephoto lens the 35 mm equivalent focal length of which is 250 mm is about four times of that of a telephoto lens the 35 mm equivalent focal length of which is 125 mm. This issue makes enormous difference, compared with how long a current wide-angle lens need to be adjusted. Further, unstable temperature due to thermal energy difference between stand-by or heavy-duty operation statuses of mobile electronic devices may deteriorate focusing of the lenses therein with additional shift on the focal length. Therefore, if a telephoto lens provides more than 5× magnification (in equivalent focal length) and operates in the environment of unstable temperature, the adjusted distance will exceed the range a current actuator may serve, and the telephoto lens will not be capable to focus on objects in the nearest positon to present a clear image.

To provide telephoto lenses, the 35 mm equivalent focal length of which exceeds 5× magnification, the major problem is to overcome the great adjusted distance exceeds the insufficient operation range of the current actuators when the telephoto lenses focus on an object the position of which may be changed from infinity to 1.200 m. Further, the longer distance the actuators can serve, the bulkier the mobile electronic devices can be. Size is another issue to consider, besides the focusing.

For example, a 35 mm equivalent focal length of a telephoto lens is 160 mm, Fno is 3.5 and image height is 2.5 mm, an entrance pupil diameter of the telephoto lens will be 5.291 mm. With a barrel mounted on the outer of the lenses, even though the telephoto lens may be designed as a periscope lens stype, the whole size of such telephoto lens will be too great to be mounted in a mobile electronic device. Accordingly, for a high magnification telephoto lenses the size of which increases along with focal length, focusing properly and mounting in a mobile electronic device are two challenging problems need to find solution in the industry.

SUMMARY

The present disclosure provides for optical imaging lenses. By providing an adjustable air gap between a pair of adjacent lens elements, distance required for adjustment to focus within a telephoto shot range may be substantially reduced. Preferably, a high magnification telephoto lenses may be applied with a current actuator.

In the specification, parameters used here are: a thickness of the first lens element along the optical axis is represented by T1, a distance from the image-side surface of the first lens element to the object-side surface of the second lens element along the optical axis is represented by G12, a thickness of the second lens element along the optical axis is represented by T2, a distance from the image-side surface of the second lens element to the object-side surface of the third lens element along the optical axis is represented by G23, a thickness of the third lens element along the optical axis is represented by T3, a distance from the image-side surface of the third lens element to the object-side surface of the fourth lens element along the optical axis is represented by G34, a thickness of the fourth lens element along the optical axis is represented by T4, a distance from the image-side surface of the fourth lens element to the object-side surface of the fifth lens element along the optical axis is represented by G45, a thickness of the fifth lens element along the optical axis is represented by T5, a distance from the image-side surface of the fifth lens element to the object-side surface of the sixth lens element along the optical axis is represented by G56, a thickness of the sixth lens element along the optical axis is represented by T6, a distance from the image-side surface of the sixth lens element to the object-side surface of the seventh lens element along the optical axis is represented by G67, a thickness of the seventh lens element along the optical axis is represented by T7, a distance from the image-side surface of the fifth lens element to the object-side surface of a filtering unit along the optical axis is represented by G5F, a distance from the image-side surface of the sixth lens element to the object-side surface of a filtering unit along the optical axis is represented by G6F, a distance from the image-side surface of the seventh lens element to the object-side surface of a filtering unit along the optical axis is represented by G7F, a thickness of the filtering unit along the optical axis is represented by TTF, a air gap from the filtering unit to an image plane along the optical axis is represented by GFP, a focal length of the first lens element is represented by f1, a focal length of the second lens element is represented by f2, a focal length of the third lens element is represented by f3, a focal length of the fourth lens element is represented by f4, a focal length of the fifth lens element is represented by f5, a focal length of the sixth lens element is represented by f6, a focal length of the seventh lens element is represented by f7, the refractive index of the first lens element is represented by n1, the refractive index of the second lens element is represented by n2, the refractive index of the third lens element is represented by n3, the refractive index of the fourth lens element is represented by n4, the refractive index of the fifth lens element is represented by n5, the refractive index of the sixth lens element is represented by n6, the refractive index of the seventh lens element is represented by n7, an abbe number of the first lens element is represented by V1, an abbe number of the second lens element is represented by V2, an abbe number of the third lens element is represented by V3, an abbe number of the fourth lens element is represented by V4, an abbe number of the fifth lens element is represented by V5, an abbe number of the sixth lens element is represented by V6, an abbe number of the seventh lens element is represented by V7, an effective focal length of the optical imaging lens, i.e. an effective focal length of the optical imaging lens positioning at 20° C. environment and focusing on an object at infinity distance, is represented by EFL, an effective focal length of the optical imaging lens after adjusting the adjustable air gap is represented by EFLA, a distance from the object-side surface of the first lens element to the image-side surface of the fifth lens element along the optical axis is represented by TL, a distance from the object-side surface of the first lens element to the image plane along the optical axis, i.e. a system length is represented by TTL, a sum of the thicknesses of five lens elements from the first lens element to the fifth lens element along the optical axis, i.e. a sum of T1, T2, T3, T4 and T5 is represented by ALT, a sum of four air gaps from the first lens element to the fifth lens element along the optical axis is represented by AAG, and a distance from the image-side surface of the fifth lens element to an image plane along the optical axis is represented by BFL, a half field of view of the optical imaging lens is represented by HFOV, an image height of the optical imaging lens is represented by ImgH, a f-number of the optical imaging lens is represented by Fno, a focal length of a lens-group between the object side and a first adjustable air gap, wherein the first adjustable air gap is arranged be an adjustable air gap in a first order from the object side to the image side, is represented by fG.

In an aspect of the present disclosure, in the optical imaging lens, five lens elements comprising a first element, a second element, a third element, a fourth element and a fifth lens element sequentially from an object side to an image side along an optical axis may be provided. Each of the first, second, third, fourth and fifth lens element may have an object-side surface facing toward the object side and allowing imaging rays to pass through and an image-side surface facing toward the image side and allowing the imaging rays to pass through. The first lens element may be arranged to be a lens element having refracting power in a first order from the object side to the image side, the second lens element may be arranged to be a lens element having refracting power in a second order from the object side to the image side, the third lens element may be arranged to be a lens element having refracting power in a third order from the object side to the image side, the fourth lens element may be arranged to be a lens element having refracting power in a fourth order from the object side to the image side, the fifth lens element may be arranged to be a lens element having refracting power in a fifth order from the object side to the image side. The optical imaging lens may have an adjustable air gap between two adjacent lens elements. The optical imaging lens may satisfy one of the following inequalities:

$6.900 \leq EFL/ImgH$    Inequality (1);

$6.400 \leq TTL/ImgH$    Inequality (2);

$HFOV/ImgH \leq 3.800°/mm$    Inequality (3);

In another example embodiment, other inequality(s), such as those relating to the ratio among parameters could be taken into consideration. For example:

$1.200 \leq EFL/fG$    Inequality (4);

$2.000 \leq EFL/(Fno*ImgH)$    Inequality (5);

$HFOV \leq 9.000°$    Inequality (6);

$EFL/BFL \leq 2.800$    Inequality (7);

$1.400 \leq TTL/TL$    Inequality (8);

$6.000 \leq TTL/T1$    Inequality (9);

$4.000 \leq TTL/(T2+G23+T3)$    Inequality (10);

$1.300 \leq ALT/AAG$    Inequality (11);

$0.900 \leq (T1+G12+T3+G34)/(T4+G45+T5)$    Inequality (12);

$1.200 \leq (G23+T3+G34)/(T1+T2)$    Inequality (13);

$0.700 \leq (T4+G45+T5)/(T1+T2)$    Inequality (14);

$(T1+G12+T2+T4+G45+T5)/(G23+T3+G34) \leq 2.500$    Inequality (15);

and/or $0.800 \leq EFL/EFLA \leq 1.200$    Inequality (16).

In some example embodiments, more details about the convex or concave surface structure, refracting power or chosen material etc. could be incorporated for one specific lens element or broadly for plural lens elements to enhance the control for the system performance and/or resolution. In a first example, the optical imaging lens may comprise a barrel and inside of which at least one of the first, second, third, fourth and fifth lens element may be received. An outer surface of the barrel may form a sectional plane parallel to the optical axis. In a second example, an optical axis region of the image-side surface of the first lens element may be concave, the third lens element may have positive refracting power, the fourth lens element may have negative refracting power, an optical axis region of the image-side surface of the fourth lens element may be concave, and an optical axis region of the object-side surface of the fifth lens element may be convex, etc. In a third example, an absolute value of the maximum difference in distance between before and after adjusting the adjustable air gap may be less or equal to 1.000 mm. The maximum difference in distance between before and after adjusting the adjustable air gap may be a distance of an adjustable air gap when the optical imaging lens focuses on an object at 1.200 m at 60° C. minus a distance of an adjustable air gap when the optical imaging lens focuses on an object at infinity at 20° C. In a fourth example, a sectional plane may be formed between the object-side surface and the image-side surface of at least one of the first, second, third, fourth and fifth lens element. An optical boundary of the lens element which has the sectional plane is different from another optical boundary of the lens element which do not have the sectional plane. Further, each of the lens element may be made from transparent materials, such as glass, plastic, resin, etc. It is noted that the details listed here could be incorporated in example embodiments if no inconsistency occurs.

In an example embodiment, an optical imaging lens comprising a first element, a second element, a third element, a fourth element and a fifth lens element sequentially from an object side to an image side along an optical axis is provided. Each of the first, second, third, fourth and fifth lens element has an object-side surface facing toward the object side and allowing imaging rays to pass through and an image-side surface facing toward the image side and allowing the imaging rays to pass through. The first lens element may be arranged to be a lens element having refracting power in a first order from the object side to the image side, the second lens element may be arranged to be a lens element having refracting power in a second order from the object side to the image side, the third lens element may be arranged to be a lens element having refracting power in a third order from the object side to the image side, the fourth lens element may be arranged to be a lens element having refracting power in a fourth order from the object side to the image side, the fifth lens element may be arranged to be a lens element having refracting power in a fifth order from the object side to the image side. The optical imaging lens may have an adjustable air gap may exist between two adjacent lens elements. The optical imaging lens satisfies the Inequality (16) and one of the Inequalities (1)~(3).

In another example embodiment, an optical imaging lens comprising a first element, a second element, a third element, a fourth element and a fifth lens element sequentially from an object side to an image side along an optical axis is provided. Each of the first, second, third, fourth and fifth lens element has an object-side surface facing toward the object side and allowing imaging rays to pass through and an image-side surface facing toward the image side and allowing the imaging rays to pass through. The first lens element may be arranged to be a lens element having refracting power in a first order from the object side to the image side, the second lens element may be arranged to be a lens element having refracting power in a second order from the object side to the image side, the third lens element may be arranged to be a lens element having refracting power in a third order from the object side to the image side, the fourth lens element may be arranged to be a lens element having refracting power in a fourth order from the object side to the image side, the fifth lens element may be arranged to be a lens element having refracting power in a fifth order from the object side to the image side. The optical imaging lens may have an adjustable air gap may exist between two adjacent lens elements. An absolute value of maximum difference in distance between before and after adjusting the adjustable air gap is less or equal to 1.000 mm. The optical imaging lens satisfies one of the Inequalities (1)~(3).

In yet another example embodiment, an optical imaging lens comprising a first element, a second element, a third element, a fourth element and a fifth lens element sequentially from an object side to an image side along an optical axis is provided. Each of the first, second, third, fourth and fifth lens element has an object-side surface facing toward the object side and allowing imaging rays to pass through and an image-side surface facing toward the image side and allowing the imaging rays to pass through. The first lens element may be arranged to be a lens element having refracting power in a first order from the object side to the image side, the second lens element may be arranged to be a lens element having refracting power in a second order from the object side to the image side, the third lens element may be arranged to be a lens element having refracting power in a third order from the object side to the image side, the fourth lens element may be arranged to be a lens element having refracting power in a fourth order from the object side to the image side, the fifth lens element may be arranged to be a lens element having refracting power in a fifth order from the object side to the image side. The optical imaging lens may have an adjustable air gap may exist between two adjacent lens elements. The optical imaging lens satisfies the Inequality (4) and one of the Inequalities (1)~(3).

In yet another example embodiment, an optical imaging lens comprising a first element, a second element, a third element, a fourth element and a fifth lens element sequentially from an object side to an image side along an optical axis is provided. Each of the first, second, third, fourth and fifth lens element has an object-side surface facing toward the object side and allowing imaging rays to pass through and an image-side surface facing toward the image side and allowing the imaging rays to pass through. The first lens element may be arranged to be a lens element having refracting power in a first order from the object side to the image side, the second lens element may be arranged to be a lens element having refracting power in a second order from the object side to the image side, the third lens element may be arranged to be a lens element having refracting power in a third order from the object side to the image side, the fourth lens element may be arranged to be a lens element having refracting power in a fourth order from the object side to the image side, the fifth lens element may be arranged to be a lens element having refracting power in a fifth order from the object side to the image side. The optical imaging lens may have an adjustable air gap may exist between two adjacent lens elements. The optical imaging lens comprises a barrel and inside of which at least one of the first, second, third, fourth and fifth lens element is received. An outer surface of the barrel is formed with a sectional plane parallel to the optical axis. The optical imaging lens satisfies the one of the Inequality (4), Inequality (16) and an absolute value of maximum difference in distance between before and after adjusting the adjustable air gap being less or equal to 1.000 mm.

In yet another example embodiment, an optical imaging lens comprising a first element, a second element, a third element, a fourth element and a fifth lens element sequentially from an object side to an image side along an optical axis is provided. Each of the first, second, third, fourth and fifth lens element has an object-side surface facing toward the object side and allowing imaging rays to pass through and an image-side surface facing toward the image side and allowing the imaging rays to pass through. The first lens element may be arranged to be a lens element having refracting power in a first order from the object side to the image side, the second lens element may be arranged to be a lens element having refracting power in a second order from the object side to the image side, the third lens element may be arranged to be a lens element having refracting power in a third order from the object side to the image side, the fourth lens element may be arranged to be a lens element having refracting power in a fourth order from the object side to the image side, the fifth lens element may be arranged to be a lens element having refracting power in a fifth order from the object side to the image side. The optical imaging lens may have an adjustable air gap may exist between two adjacent lens elements. A sectional plane is formed between the object-side and image-side surfaces of at least one of the first, second, third, fourth and fifth lens element, and an optical boundary of the lens element having the sectional plane is different from another optical boundary of the lens element not having the sectional plane. The optical imaging lens satisfies the one of the Inequality (4), Inequality (16) and an absolute value of maximum difference in distance between before and after adjusting the adjustable air gap being less or equal to 1.000 mm.

In yet another example embodiment, an optical imaging lens comprising a first element, a second element, a third element, a fourth element and a fifth lens element sequentially from an object side to an image side along an optical axis is provided. Each of the first, second, third, fourth and fifth lens element has an object-side surface facing toward the object side and allowing imaging rays to pass through and an image-side surface facing toward the image side and allowing the imaging rays to pass through. The first lens element may be arranged to be a lens element having refracting power in a first order from the object side to the image side, the second lens element may be arranged to be a lens element having refracting power in a second order from the object side to the image side, the third lens element may be arranged to be a lens element having refracting power in a third order from the object side to the image side, the fourth lens element may be arranged to be a lens element having refracting power in a fourth order from the object side to the image side, the fifth lens element may be arranged to be a lens element having refracting power in a fifth order from the object side to the image side. The optical imaging lens may have an adjustable air gap may exist between two adjacent lens elements. An optical axis region of the image-side surface of the first lens element is concave, the third lens element has positive refracting power, the fourth lens element has negative refracting power, an optical axis region of the image-side surface of the fourth lens element is concave, an optical axis region of the object-side surface of the fifth lens element is convex. The optical imaging lens satisfies the one of the Inequality (4), Inequality (16) and an absolute value of maximum difference in distance between before and after adjusting the adjustable air gap being less or equal to 1.000 mm.

The optical imaging lens in example embodiments may substantially reduce the distance required for adjustment to focus within a telephoto shot range and resolve the problem that cannot focus.

BRIEF DESCRIPTION OF THE DRAWINGS

Example embodiments will be more readily understood from the following detailed description when read in conjunction with the appended drawing, in which:

FIG. 1 depicts a cross-sectional view of one single lens element according to the present disclosure;

FIG. 2 depicts a cross-sectional view showing the relation between the shape of a portion and the position where a collimated ray meets the optical axis;

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 10 depicts data related to temperature and adjustable air gap of a first embodiment of the optical imaging lens according to the present disclosure;

FIG. 13 depicts a table of optical data for each lens element of the optical imaging lens of a second embodiment of the present disclosure;

FIG. 14 depicts a table of aspherical data of a second embodiment of the optical imaging lens according to the present disclosure;

FIG. 15 depicts data related to temperature and adjustable air gap of a second embodiment of the optical imaging lens according to the present disclosure;

FIG. 18 depicts a table of optical data for each lens element of the optical imaging lens of a third embodiment of the present disclosure;

FIG. 19 depicts a table of aspherical data of a third embodiment of the optical imaging lens according to the present disclosure;

FIG. 20 depicts data related to temperature and adjustable air gap of a third embodiment of the optical imaging lens according to the present disclosure;

FIG. 23 depicts a table of optical data for each lens element of the optical imaging lens of a fourth embodiment of the present disclosure;

FIG. 24 depicts a table of aspherical data of a fourth embodiment of the optical imaging lens according to the present disclosure;

FIG. 25 depicts data related to temperature and adjustable air gap of a fourth embodiment of the optical imaging lens according to the present disclosure;

FIG. 28 depicts a table of optical data for each lens element of the optical imaging lens of a fifth embodiment of the present disclosure;

FIG. 29 depicts a table of aspherical data of a fifth embodiment of the optical imaging lens according to the present disclosure;

FIG. 30 depicts data related to temperature and adjustable air gap of a fifth embodiment of the optical imaging lens according to the present disclosure;

FIG. 33 depicts a table of optical data for each lens element of the optical imaging lens of a sixth embodiment of the present disclosure;

FIG. 34 depicts a table of aspherical data of a sixth embodiment of the optical imaging lens according to the present disclosure;

FIG. 35 depicts data related to temperature and adjustable air gap of a sixth embodiment of the optical imaging lens according to the present disclosure;

FIG. 38 depicts a table of optical data for each lens element of a seventh embodiment of an optical imaging lens according to the present disclosure;

FIG. 39 depicts a table of aspherical data of a seventh embodiment of the optical imaging lens according to the present disclosure;

FIG. 40 depicts data related to temperature and adjustable air gap of a seventh embodiment of the optical imaging lens according to the present disclosure;

FIG. 43 depicts a table of optical data for each lens element of an eighth embodiment of an optical imaging lens according to the present disclosure;

FIG. 44 depicts a table of aspherical data of an eighth embodiment of the optical imaging lens according to the present disclosure;

FIG. 45 depicts data related to temperature and adjustable air gap of an eighth embodiment of the optical imaging lens according to the present disclosure;

FIG. 48 depicts a table of optical data for each lens element of a ninth embodiment of an optical imaging lens according to the present disclosure;

FIG. 49 depicts a table of aspherical data of a ninth embodiment of the optical imaging lens according to the present disclosure;

FIG. 50 depicts data related to temperature and adjustable air gap of a ninth embodiment of the optical imaging lens according to the present disclosure;

FIG. 51 depicts a table for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of all nine example embodiments;

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

The terms "optical axis region", "periphery region", "concave", and "convex" used in this specification and claims should be interpreted based on the definition listed in the specification by the principle of lexicographer.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
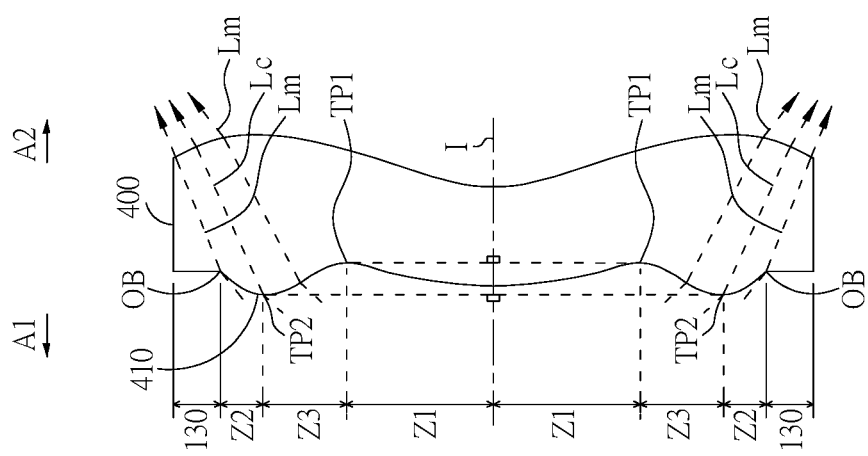
FIG. 4 depicts a cross-sectional view showing a second example of determining the shape of lens element regions and the boundaries of regions.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
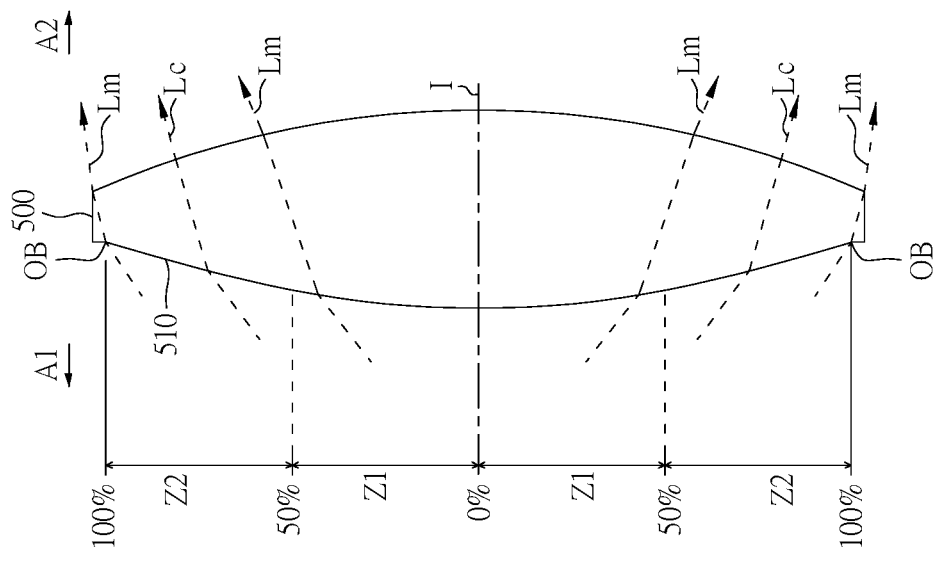
FIG. 5 depicts a cross-sectional view showing a third example of determining the shape of lens element regions and the boundaries of regions.
Figure 3:
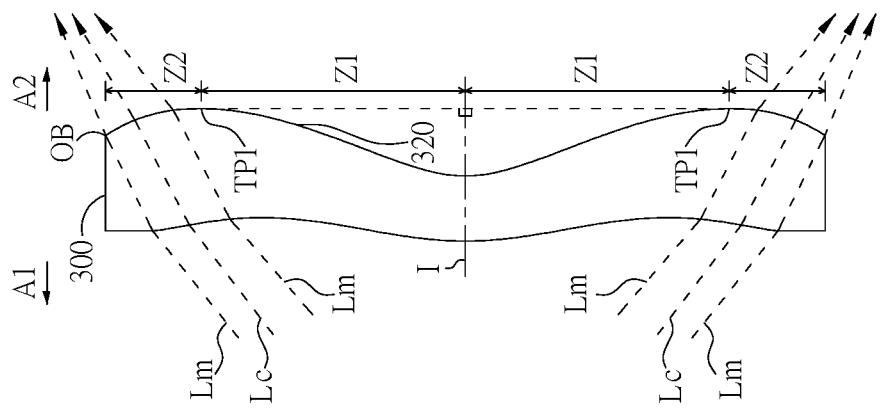
FIG. 3 depicts a cross-sectional view showing a first example of determining the shape of lens element regions and the boundaries of regions.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Example embodiments of an optical imaging lens may comprise at least five lens element having refracting power, such as a first lens element, a second lens element, a third lens element, a fourth lens element and a fifth lens element, sequentially from an object side to an image side. Additional lens element(s) may be positioned after the fifth lens element and named in the order. For example, a sixth lens element and a seventh lens element may be positioned after the fifth lens element. Each of the lens elements may comprise an object-side surface facing toward an object side allowing imaging rays to pass through and an image-side surface facing toward an image side allowing the imaging rays to pass through. Through adjusting an adjustable air gap between two adjacent lens elements and satisfying a range of parameter, the distance required for adjustment when optical imaging lens in example embodiments, as a telephoto lens, focuses may greatly reduced. Preferably, a current actuator may be applied to provide high magnification.

In an example embodiment, the optical imaging lens may provide an adjustable air gap and satisfy 6.900≤EFL/ImgH, 6.400≤TTL/ImgH or HFOV/ImgH≤3.800°/mm. It may be beneficial to overcome the limitation of the service range of a current actuator. Replacing adjusting the distance between the optical imaging lens and the image plane by adjusting the adjustable air gap, the optical imaging lens may focus on an object the position of which may be varied from infinity to 1.200 m. As such, the optical imaging lens may be served as a telephoto lens and focus properly with the actuator. Preferably, the optical imaging lens may further satisfy 7.300≤EFL/ImgH, 6.700≤TTL/ImgH or HFOV/ImgH≤3.100°/mm. Then, it may be beneficial to increase equivalent focal length of the telephoto lens to increase the magnification. The more preferably, the optical imaging lens may further satisfy 7.300≤EFL/ImgH≤14.000, 6.700≤TTL/ImgH≤16.000 or 1.600°/mm≤HFOV/ImgH≤3.100°/mm to avoid excessive length of the equivalent focal length to make it impossible to position the optical imaging lens in a mobile electronic device.

In an example embodiment, the optical imaging lens may provide an adjustable air gap and satisfy 0.800≤EFL/EFLA≤1.200 and 6.900≤EFL/ImgH, 6.400≤TTL/ImgH or HFOV/ImgH≤3.800°/mm. It may be beneficial to overcome the limitation of the service range of a current actuator. Replacing adjusting the distance between the optical imaging lens and the image plane by adjusting the adjustable air gap, the optical imaging lens may focus on an object the position of which may be varied from infinity to 1.200 m. As such, the size of the actuator may be reduced by limiting a ratio of the effective focal length between before and after adjusting the adjustable air gap. Preferably, the optical imaging lens may further satisfy 0.900≤EFL/EFLA≤1.100, 7.300≤EFL/ImgH, 6.700≤TTL/ImgH or HFOV/ImgH≤3.100°/mm, and then it may be beneficial to increase the equivalent focal length of the telephoto lens to increase the magnification. The more preferably, the optical imaging lens may further satisfy 0.950≤EFL/EFLA≤1.050, 7.300≤EFL/ImgH≤14.000, 6.700≤TTL/ImgH≤16.000 or 1.600°/mm≤HFOV/ImgH≤3.100°/mm to avoid excessive length of the equivalent focal length to make it impossible to position the optical imaging lens in a mobile electronic device.

In an example embodiment, the optical imaging lens may provide an adjustable air gap, and the optical imaging lens may satisfy absolute value of the maximum difference in distance between before and after adjusting the adjustable air gap being less or equal to 1.000 mm, 6.900≤EFL/ImgH, 6.400≤TTL/ImgH or HFOV/ImgH≤3.800°/mm or HFOV/ImgH≤3.800°/mm. It may be beneficial to overcome the limitation of the service range of a current actuator. Replacing adjusting the distance between the optical imaging lens and the image plane by adjusting the adjustable air gap, the optical imaging lens may focus on an object the position of which may be varied from infinity to 1.200 m. As such, the size of the actuator may be reduced by limiting a ratio of the focal length between before and after adjusting the adjustable air gap. Preferably, the absolute value of the maximum difference in distance between before and after adjusting the adjustable air gap may be less or equal to 0.500 mm, the optical imaging lens may further satisfy 7.300≤EFL/ImgH, 6.700≤TTL/ImgH or HFOV/ImgH≤3.100°/mm, and then it may be beneficial to increase the equivalent focal length of the telephoto lens to increase the magnification. The more preferably, the absolute value of the maximum difference in distance between before and after adjusting the adjustable air gap may be less or equal to 0.400 mm, the optical imaging lens may further satisfy 7.300≤EFL/ImgH≤14.000, 6.700≤TTL/ImgH≤16.000 or 1.600°/mm HFOV/ImgH≤3.100°/mm to avoid excessive length of the equivalent focal length to make it impossible to position the optical imaging lens in a mobile electronic device.

In an example embodiment, the optical imaging lens may provide an adjustable air gap, and satisfy 1.200≤EFL/fG and 6.900≤EFL/ImgH, 6.400≤TTL/ImgH or HFOV/ImgH≤3.800°/mm. It may be beneficial to overcome the limitation of the service range of a current actuator. Replacing adjusting the distance between the optical imaging lens and the image plane by adjusting the adjustable air gap, the optical imaging lens may focus on an object the position of which may be varied from infinity to 1.200 m. As such, the greater the ratio of EFL/fG is, the less distance required for adjustment in the adjustable air gap is. Preferably, the optical imaging lens may further satisfy 1.200≤EFL/fG≤3.000, 7.300≤EFL/ImgH, 6.700≤TTL/ImgH or HFOV/ImgH≤3.100°/mm, and then it may be beneficial to increase the equivalent focal length of the telephoto lens to increase the magnification. The more preferably, the optical imaging lens may further satisfy 1.500≤EFL/fG≤3.000, 7.300≤EFL/ImgH≤14.000, 6.700≤TTL/ImgH≤16.000 or 1.600°/mm≤HFOV/ImgH≤3.100°/mm to avoid excessive length of the equivalent focal length to make it impossible to position the optical imaging lens in a mobile electronic device.

In an example embodiment, the optical imaging lens may comprise a barrel having a sectional plane, provide an adjustable air gap between the lens elements, and satisfy 0.800≤EFL/EFLA≤1.200, absolute value of the maximum difference in distance between before and after adjusting the adjustable air gap being less or equal to 1.000 mm, or 1.200≤EFL/fG. It may be beneficial to overcome the limitation of the service range of a current actuator. Replacing adjusting the distance between the optical imaging lens and the image plane by adjusting the adjustable air gap, the optical imaging lens may focus on an object the position of which may be varied from infinity to 1.200 m. As such, the size of the telephoto lens may be reduced by the barrel having the sectional plane.

In an example embodiment, the optical imaging lens may comprise a lens element having a sectional plane, provide an adjustable air gap between the lens elements, and satisfy 0.800≤EFL/EFLA≤1.200, absolute value of the maximum difference in distance between before and after adjusting the adjustable air gap being less or equal to 1.000 mm, or 1.200≤EFL/fG. It may be beneficial to overcome the limitation of the service range of a current actuator. Replacing adjusting the distance between the optical imaging lens and the image plane by adjusting the adjustable air gap, the optical imaging lens may focus on an object the position of which may be varied from infinity to 1.200 m. As such, the size of the telephoto lens may be reduced by the lens element having the sectional plane.

In an example embodiment, the optical imaging lens may further comprise the details: an optical axis region of the image-side surface of the first lens element is concave, an optical axis region of the image-side surface of the fourth lens element is concave, an optical axis region of the object-side surface of the fifth lens element is convex, an adjustable air gap between the lens elements is provided, the third lens element has positive refracting power and the fourth lens element has negative refracting ower, and satisfy 0.800≤EFL/EFLA≤1.200, absolute value of the maximum difference in distance between before and after adjusting the adjustable air gap being less or equal to 1.000 mm, or 1.200≤EFL/fG. It may be beneficial to overcome the limitation of the service range of a current actuator. Replacing adjusting the distance between the optical imaging lens and the image plane by adjusting the adjustable air gap, the optical imaging lens may focus on an object the position of which may be varied from infinity to 1.200 m.

In an example embodiment, the optical imaging lens may further satisfy HFOV≤9.000° and aforesaid shape configurations, it may be beneficial to increase the equivalent focal length of the telephoto lens. Preferably, the optical imaging lens may further satisfy HFOV≤8.600°, and the more preferably, 4.000°≤HFOV≤8.600° to avoid excessive length of the equivalent focal length to make it impossible to position the optical imaging lens in a mobile electronic device.

In an example embodiment, the optical imaging lens may further satisfy V1>V2+V4, V3>V2+V4 or V5>V2+V4 to adjust chromatic aberration.

In an example embodiment, the optical imaging lens may comprise five lens element having refracting power to promote yield and reduce cost; preferably, the optical imaging lens may comprise six or more lens elements having refracting power to increase 35 mm equivalent focal length and improve imaging quality; the more preferably, the optical imaging lens may comprise no greater than seven lens elements having refracting power to control the yield, increase 35 mm equivalent focal length and improve imaging quality.

When the optical imaging lens further satisfies at least one of EFL/BFL≤2.800, 1.400≤TTL/TL, 6.000≤TTL/T1, 4.000≤TTL/(T2+G23+T3), 1.600≤ALT/AAG, 0.900≤(T1+G12+T3+G34)/(T4+G45+T5), 1.200 (G23+T3+G34)/(T1+T2), 0.700≤(T4+G45+T5)/(T1+T2) and (T1+G12+T2+T4+G45+T5)/(G23+T3+G34)≤2.500, the thickness of the lens elements and/or the air gaps between the lens elements may be shortened properly to avoid any excessive value of the parameters which may be unfavorable and may thicken the system length of the whole system of the optical imaging lens, and to avoid any insufficient value of the parameters which may increase the production difficulty of the optical imaging lens. Preferably, the optical imaging lens may satisfy at least one of 1.200≤EFL/BFL≤2.800, 1.400≤TTL/TL≤2.700, 6.000≤TTL/T1≤150.000, 4.000≤TTL/(T2+G23+T3)≤14.000, 1.600≤ALT/AAG≤8.600, 0.900≤(T1+G12+T3+G34)/(T4+G45+T5)≤4.000, 1.200≤(G23+T3+G34)/(T1+T2)≤11.000, 0.700≤(T4+G45+T5)/(T1+T2)≤4.200 and 0.500≤(T1+G12+T2+T4+G45+T5)/(G23+T3+G34)≤2.500.

In light of the unpredictability in an optical system, in the present disclosure, satisfying these inequalities listed above may result in promoting the imaging quality, increasing 35 mm equivalent focal length, shortening the system length, lowering the f-number and/or increasing the yield in the assembly process.

When implementing example embodiments, more details about the convex or concave surface or refracting power could be incorporated for one specific lens element or broadly for plural lens elements to improve the control for the system performance and/or resolution, or promote the yield. In a first example, the optical imaging lens may comprise a barrel inside of which at least one of the first, second, third, fourth and fifth lens element may be received. An outer surface of the barrel may form a sectional plane parallel to the optical axis. In a second example, an optical axis region of the image-side surface of the first lens element may be concave, the third lens element may have positive refracting power, the fourth lens element may have negative refracting power, an optical axis region of the image-side surface of the fourth lens element may be concave, and an optical axis region of the object-side surface of the fifth lens element may be convex, etc. In a third example, absolute value of the maximum difference in distance between before and after adjusting the adjustable air gap may be less or equal to 1.000 mm. The maximum difference in distance between before and after adjusting the adjustable air gap may be a distance of the adjustable air gap when the optical imaging lens focuses on an object at 1.200 m at 60° C. minus a distance of the adjustable air gap when the optical imaging lens focuses on an object at infinity at 20° C. In a fourth example, a sectional plane may be formed between the object-side surface and the image-side surface of at least one of the first, second, third, fourth and fifth lens element. An optical boundary of the lens element which has the sectional plane is different from another optical boundary of the lens element which do not have the sectional plane. Further, each of the lens element may be made from transparent materials, such as glass, plastic, resin, etc. It is noted that the details listed here could be incorporated in example embodiments if no inconsistency occurs.

Figure 6:
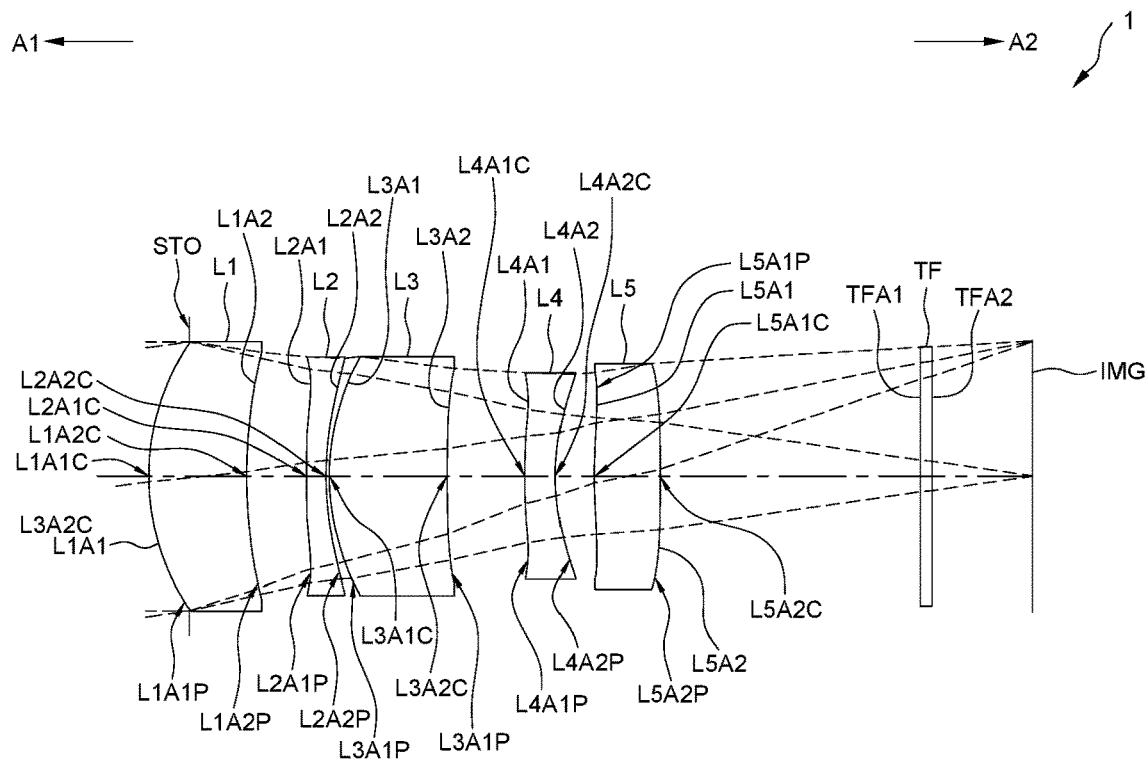
FIG. 6 depicts a cross-sectional view of a first embodiment of an optical imaging lens having five lens elements according to the present disclosure.
Figure 7:
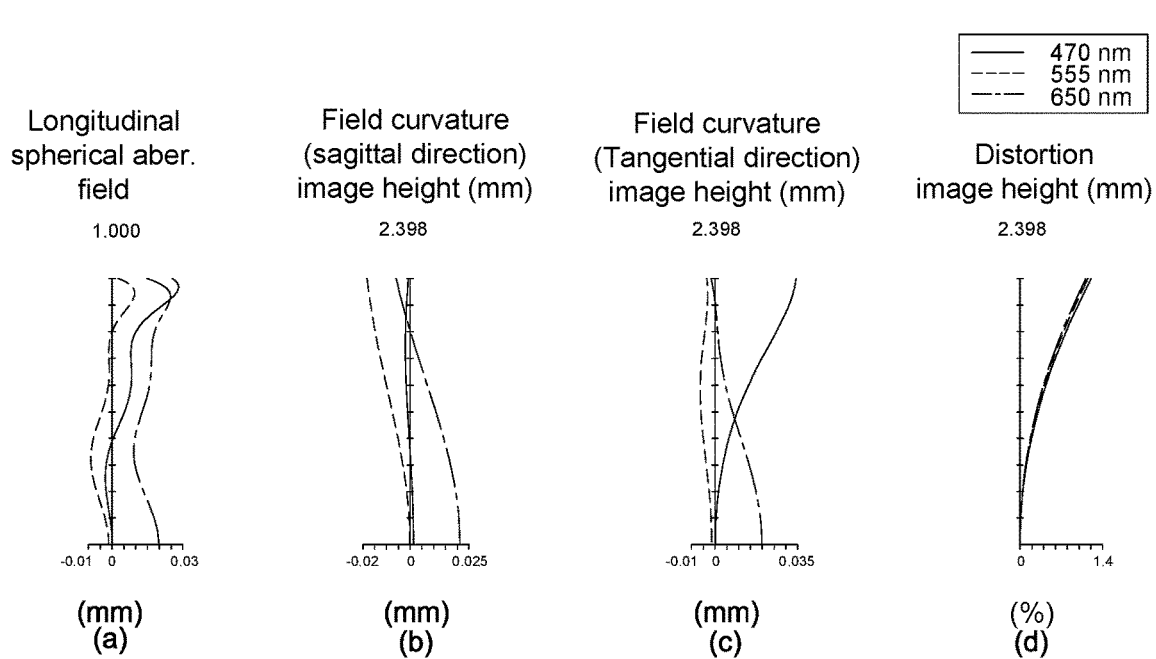
FIG. 7 depicts a chart of a longitudinal spherical aberration and other kinds of optical aberrations of a first embodiment of the optical imaging lens according to the present disclosure.

Several example embodiments and associated optical data will now be provided for illustrating example embodiments of an optical imaging lens with good optical characteristics, a wide view angle and/or a low f-number. Reference is now made to FIGS. 6-10. FIG. 6 illustrates an example cross-sectional view of an optical imaging lens 1 having five lens elements of the optical imaging lens according to a first example embodiment. FIG. 7 shows example charts of a longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment. FIG. 10 depicts data related to temperature and adjustable air gap of a first embodiment of the optical imaging lens according to the present disclosure. A difference in distance between before and after adjusting the adjustable air gap may be a distance of an adjustable air gap when the optical imaging lens focuses on an object at a different distance at a different temperature minus a distance of an adjustable air gap when the optical imaging lens focuses on an object at infinity at 20° C.

As shown in FIG. 6, the optical imaging lens 1 of the present embodiment may comprise, in order from an object side A1 to an image side A2 along an optical axis, an aperture stop STO, a first lens element L1, a second lens element L2, a third lens element L3, a fourth lens element L4 and a fifth lens element L5. A filtering unit TF and an image plane IMG of an image sensor may be positioned at the image side A2 of the optical lens 1. Each of the first, second, third, fourth and fifth lens element L1, L2, L3, L4, L5 and the filtering unit TF may comprise an object-side surface L1A1/L2A1/L3A1/L4A1/L5A1/TFA1 facing toward the object side A1 and an image-side surface L1A2/L2A2/L3A2/L4A2/L5A2/TFA2 facing toward the image side A2. The filtering unit TF, positioned between the fifth lens element L5 and the image plane IMG, may selectively absorb light with specific wavelength(s) from the light passing through optical imaging lens 1. The example embodiment of the filtering unit TF which may selectively absorb light with specific wavelength(s) from the light passing through optical imaging lens 1 is an IR cut filter (infrared cut filter). Then, IR light may be absorbed, and this may prohibit the IR light, which might not be seen by human eyes, from producing an image on the image plane IMG.

Example embodiments of each of the first, second, third, fourth and fifth lens element L1, L2, L3, L4, L5 of the optical imaging lens 1, which may be constructed by plastic. Glass, resin or other transparent material, may be optionally used to construct one of the first, second, third, fourth and fifth lens element L1, L2, L3, L4, L5.

An example embodiment of the first lens element L1 may have positive refracting power. On the object-side surface L1A1, an optical axis region L1A1C may be convex and a periphery region L1A1P may be convex. On the image-side surface L1A2, an optical axis region L1A2C may be concave and a periphery region L1A2P may be concave.

An example embodiment of the second lens element L2 may have negative refracting power. On the object-side surface L2A1, an optical axis region L2A1C may be convex and a periphery region L2A1P may be concave. On the image-side surface L2A2, an optical axis region L2A2C may be concave and a periphery region L2A2P may be concave.

An example embodiment of the third lens element L3 may have positive refracting power. On the object-side surface L3A1, an optical axis region L3A1C may be convex and a periphery region L3A1P may be convex. On the image-side surface L3A2, an optical axis region L3A2C may be concave and a periphery region L3A2P may be concave.

An example embodiment of the fourth lens element L4 may have negative refracting power. On the object-side surface L4A1, an optical axis region L4A1C may be convex and a periphery region L4A1P may be concave. On the image-side surface L4A2, an optical axis region L4A2C may be concave and a periphery region L4A2P may be concave.

An example embodiment of the fifth lens element L5 may have positive refracting power. On the object-side surface L5A1, an optical axis region L5A1C may be convex and a periphery region L5A1P may be concave. On the image-side surface L5A2, an optical axis region L5A2C may be convex and a periphery region L5A2P may be convex.

In example embodiments, air gaps may exist between each pair of adjacent lens elements L1, L2, L3, L4, L5, as well as between the fifth lens element L5 and the filtering unit TF, and the filtering unit TF and the image plane IMG of the image sensor. Please note, in other embodiments, any of the aforementioned air gaps may or may not exist. For example, profiles of opposite surfaces of a pair of adjacent lens elements may align with and/or attach to each other, and in such situations, the air gap may not exist. In the present embodiment, both the air gap between the third lens element L3 and the fourth lens element L4 and the air gap between the fifth lens element L5 and the image plane IMG are adjustable air gaps, i.e. G34 and G5F are adjustable. Three lens groups are formed in the first, second, third, fourth and fifth lens element L1, L2, L3, L4, L5 and the filtering unit TF. A first lens group comprises the first, second, third lens element L1, L2, L3. A second lens group comprises the fourth and fifth lens element L4, L5. A third lens group comprises the filtering unit TF and the image plane IMG. When the optical imaging lens 1 focuses, an actuator, such as a voice coil motor, may control the movement of the second lens group along the optical axis to adjust the adjustable air gaps G34 and G5F. If G34 is decreased, G5F will be increased accordingly, and vice versa. The other air gaps, such as G12, G23, G45, are not adjusted.

FIG. 8 depicts the optical characteristics of each lens elements in the optical imaging lens 1 of the present embodiment. Please also refer to FIG. 51 for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) corresponding to the present embodiment, in which each calculation is based on the optical characteristics of the optical imaging lens 1 which is at 20° C. and focusing at infinity distance.

The aspherical surfaces, including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4 and the object-side surface L5A1 and the image-side surface L5A2 of the fifth lens element L5 may all be defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; $a_i$ represents an aspherical coefficient of $i^{th}$ level. The values of each aspherical parameter are shown in FIG. 9.

Please refer to FIG. 7(*a*), a longitudinal spherical aberration of the optical imaging lens in the present embodiment is shown in coordinates in which the horizontal axis represents focus and the vertical axis represents field of view, and FIG. 7(*b*), curvature of field of the optical imaging lens in the present embodiment in the sagittal direction is shown in coordinates in which the horizontal axis represents focus and the vertical axis represents image height, and FIG. 7(*c*), curvature of field in the tangential direction of the optical imaging lens in the present embodiment is shown in coordinates in which the horizontal axis represents focus and the vertical axis represents image height, and FIG. 7(*d*), distortion aberration of the optical imaging lens in the present embodiment is shown in coordinates in which the horizontal axis represents percentage and the vertical axis represents image height.

The curves of different wavelengths (470 nm, 555 nm, 650 nm) may be close to each other. This represents that off-axis light with respect to these wavelengths may be focused around an image point. From the vertical deviation of each curve shown therein, the offset of the off-axis light relative to the image point may be within about −0.01~0.03 mm. Therefore, the present embodiment may improve the longitudinal spherical aberration with respect to different wavelengths. For curvature of field in the sagittal direction, the focus variation with respect to the three wavelengths in the whole field may fall within about −0.02~0.025 mm, for curvature of field in the tangential direction, the focus variation with respect to the three wavelengths in the whole field may fall within about −0.01~0.035 mm, and the variation of the distortion aberration may be within about 0~1.4%. According to the above data, the optical imaging lens 1 may provide good imaging quality.

Further, from FIG. 8, the optical imaging lens 1 may provide a 35 mm equivalent focal length of 149.878 mm and greater magnification when mounted along with a wide-angle lens, compared with conventional optical imaging lenses. According to the data shown in FIG. 10, the absolute value of the distance difference between before and after adjusting the adjustable air gaps is merely within 0.276 mm. Therefore, the limited service range of a current actuator is no longer a problem when the optical imaging lens 1, as a telephoto lens, focuses on an object the position of which may be varied from infinity to 1.200 m by adjusting the adjustable air gaps with an actuator.

Figure 11:
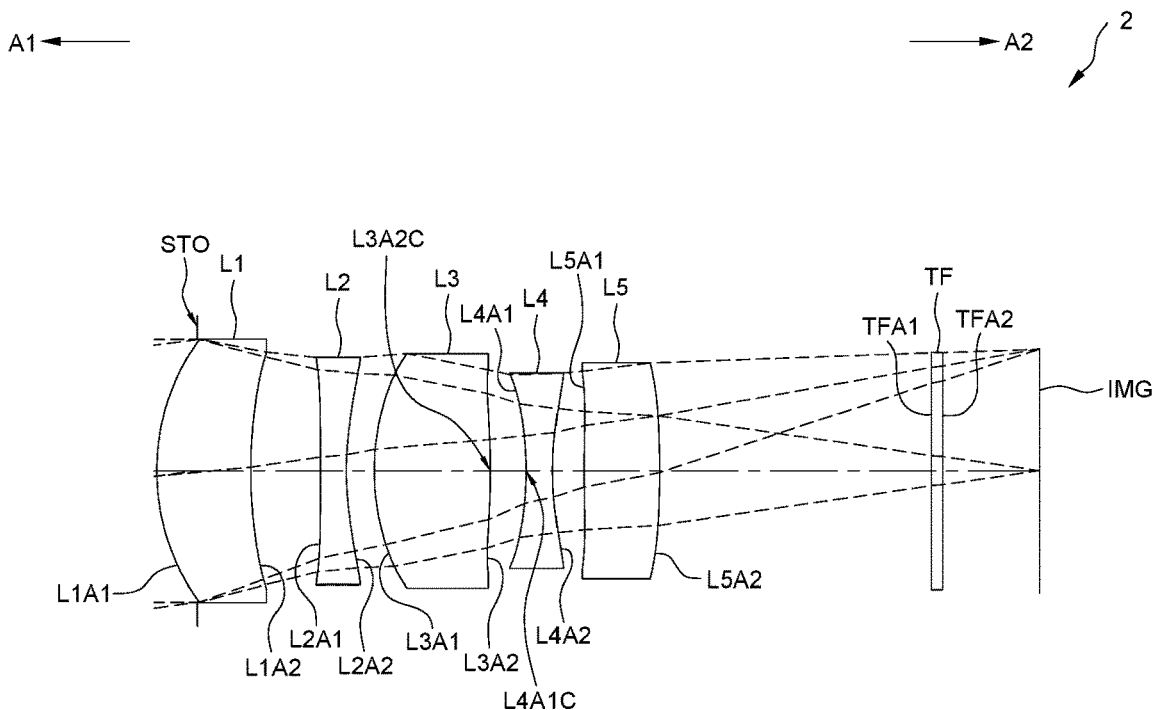
FIG. 11 depicts a cross-sectional view of a second embodiment of an optical imaging lens having five lens elements according to the present disclosure.
Figure 12:
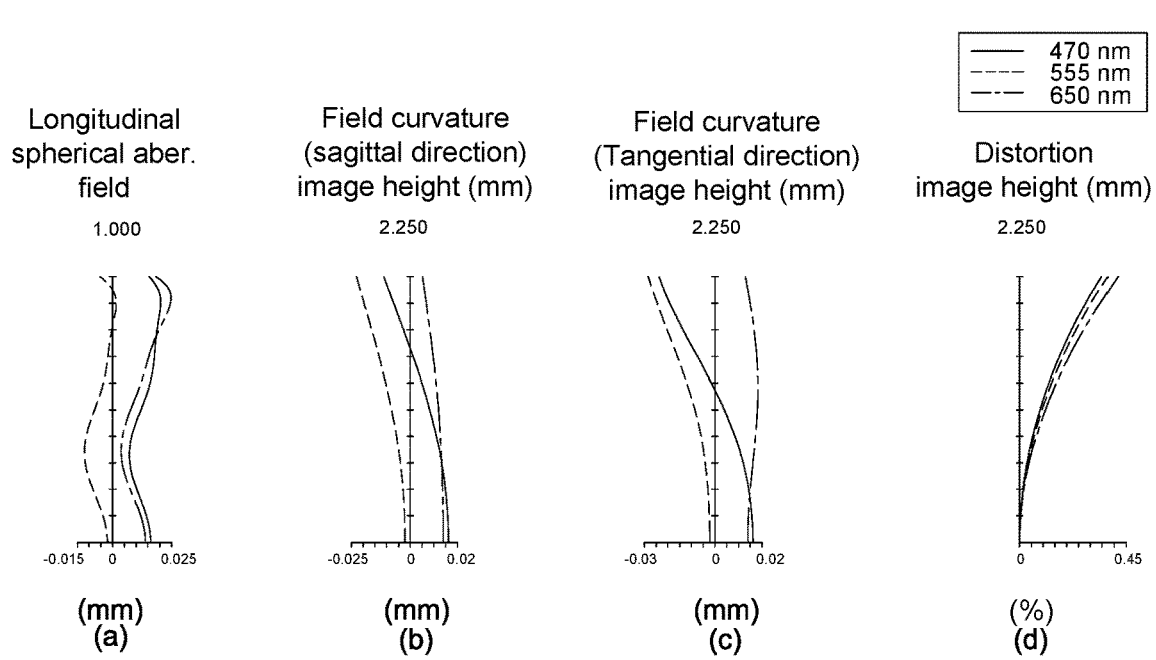
FIG. 12 depicts a chart of a longitudinal spherical aberration and other kinds of optical aberrations of a second embodiment of the optical imaging lens according to the present disclosure.

Reference is now made to FIGS. 11-15. FIG. 11 illustrates an example cross-sectional view of an optical imaging lens 2 having five lens elements of the optical imaging lens according to a second example embodiment. FIG. 12 shows example charts of a longitudinal spherical aberration and other kinds of optical aberrations of the optical imaging lens 2 according to the second example embodiment. FIG. 13 shows an example table of optical data of each lens element of the optical imaging lens 2 according to the second example embodiment. FIG. 14 shows an example table of aspherical data of the optical imaging lens 2 according to the second example embodiment. FIG. 15 depicts data related to temperature and adjustable air gap of a second embodiment of the optical imaging lens according to the present disclosure. As shown in FIG. 11, the optical imaging lens 2 of the present embodiment, in an order from an object side A1 to an image side A2 along an optical axis, may comprise an aperture stop STO, a first lens element L1, a second lens element L2, a third lens element L3, a fourth lens element L4 and a fifth lens element L5.

The differences between the second embodiment and the first embodiment may include the radius of curvature, thickness of each lens element, the value of each air gap, aspherical data, related optical parameters, such as back focal length, the configuration of the concave/convex shape of the object-side surface L4A1 and the image-side surface L3A2, the position of adjustable air gaps and the glass material of the first lens element L1; but the configuration of the concave/convex shape of surfaces, comprising the object-side surfaces L1A1, L2A1, L3A1 and L5A1 facing to the object side A1 and the image-side surfaces L1A2, L2A2, L4A2 and L5A2 facing to the image side A2, and positive or negative configuration of the refracting power of each lens element L1, L2, L3, L4, L5 may be similar to those in the first embodiment. Here, in the interest of clearly showing the drawings of the present embodiment, only the surface shapes which are different from that in the first embodiment may be labeled. Specifically, in the present embodiment, the optical axis region L3A2C of the image-side surface L3A2 of the third lens element L3 may be convex, and the optical axis region L4A1C of the object-side surface L4A1 of the fourth lens element L4 may be concave. The air gap between the first and second lens element L1, L2 and the one between the third and fourth lens element L3, L4 are adjustable air gaps, i.e. G12 and G34 are adjustable. Three lens groups are formed in the first, second, third, fourth and fifth lens element L1, L2, L3, L4, L5 and the filtering unit TF. A first lens group comprises the first lens element L1. A second lens group comprises the second and third lens element L2, L3. A third lens group comprises the fourth and fifth lens element L4, L5 and the filtering unit TF to the image plane IMG. When the optical imaging lens 2 focuses, an actuator, such as a voice coil motor, may control the movement of the second lens group along the optical axis to adjust the adjustable air gaps G12 and G34. If G12 is decreased, G34 will be increased accordingly, and vice versa. The other air gaps, such as G23, G45, G5F, are not adjusted. Please refer to FIG. 13 for the optical characteristics of each lens elements in the optical imaging lens 2 the present embodiment, and please refer to FIG. 51 for the values of EFL/ImgH, TTL/ImgH, HFOV/ImgH, EFL/fG, EFL/

(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of the present embodiment, calculated at 20° C. when focusing on infinity.

As the longitudinal spherical aberration shown in FIG. 12(a), the offset of the off-axis light relative to the image point may be within about −0.015~0.025 mm. As the curvature of field in the sagittal direction shown in FIG. 12(b), the focus variation with regard to the three wavelengths in the whole field may fall within about −0.025~0.02 mm. As the curvature of field in the tangential direction shown in FIG. 12(c), the focus variation with regard to the three wavelengths in the whole field may fall within about −0.03~0.02 mm. As shown in FIG. 12(d), the variation of the distortion aberration may be within about 0~0.45%. Compared with the first embodiment, the distortion aberration of the optical imaging lens 2 may be smaller. The optical imaging lens 2 may provide good imaging quality.

Further, from FIG. 13, the optical imaging lens 2 may provide a 35 mm equivalent focal length of 161.746 mm, better than that of the first embodiment, and greater magnification when mounted along with a wide-angle lens, compared with conventional optical imaging lenses. According to the data shown in FIG. 15, temperature stability is better because of the glass material of the first lens element L1, and the absolute value of the distance difference between before and after adjusting the adjustable air gaps from infinity to 1.200 m with −20~60° C. temperature variation is merely within 0.125 mm, also better than that in the first embodiment. Therefore, the limited service range of a current actuator is no longer a problem when the optical imaging lens 2, as a telephoto lens, focuses on an object the position of which may be varied from infinity to 1.200 m by adjusting the adjustable air gaps with an actuator.

Figure 16:
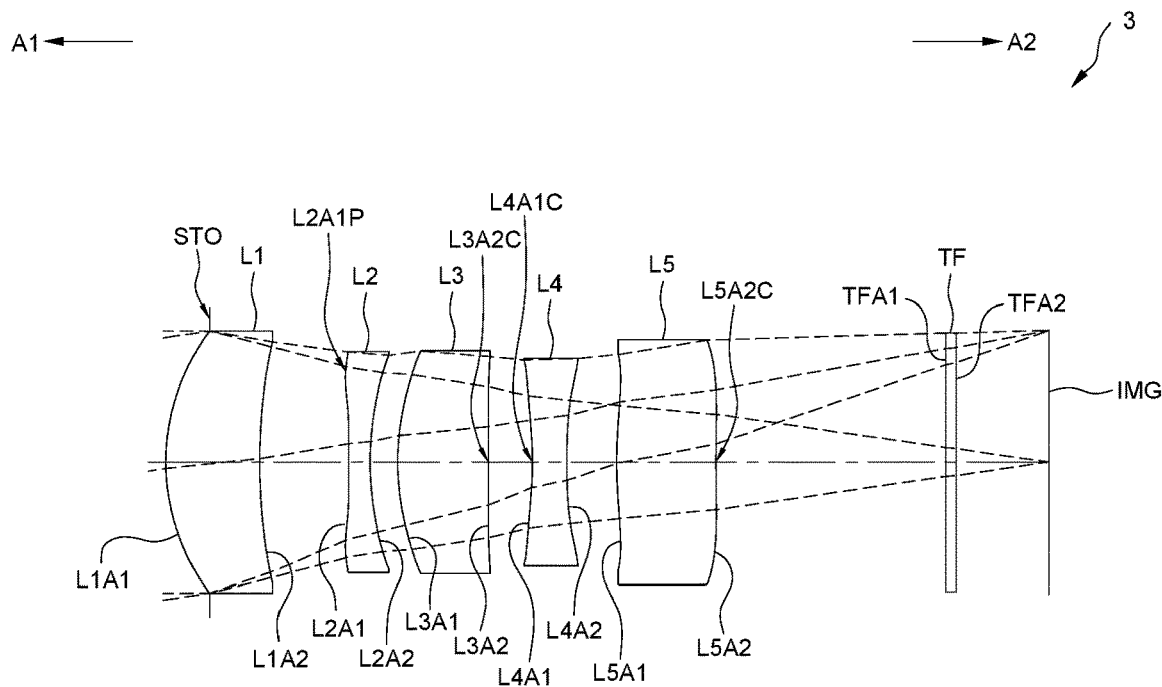
FIG. 16 depicts a cross-sectional view of a third embodiment of an optical imaging lens having five lens elements according to the present disclosure.
Figure 17:
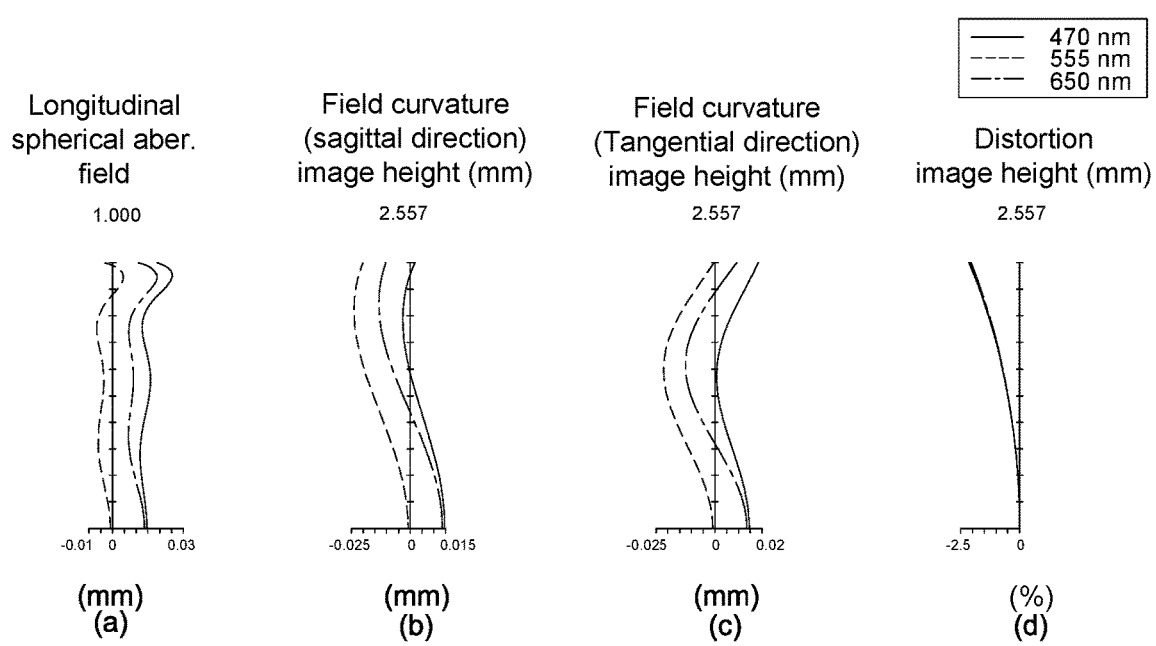
FIG. 17 depicts a chart of a longitudinal spherical aberration and other kinds of optical aberrations of a third embodiment of the optical imaging lens according the present disclosure.

Reference is now made to FIGS. 16-20. FIG. 16 illustrates an example cross-sectional view of an optical imaging lens 3 having five lens elements of the optical imaging lens according to a third example embodiment. FIG. 17 shows example charts of a longitudinal spherical aberration and other kinds of optical aberrations of the optical imaging lens 3 according to the third example embodiment. FIG. 18 shows an example table of optical data of each lens element of the optical imaging lens 3 according to the third example embodiment. FIG. 19 shows an example table of aspherical data of the optical imaging lens 3 according to the third example embodiment. FIG. 20 depicts data related to temperature and adjustable air gap of a third embodiment of the optical imaging lens according to the present disclosure. As shown in FIG. 16, the optical imaging lens 3 of the present embodiment, in an order from an object side A1 to an image side A2 along an optical axis, may comprise an aperture stop STO, a first lens element L1, a second lens element L2, a third lens element L3, a fourth lens element L4 and a fifth lens element L5.

The differences between the third embodiment and the first embodiment may include the radius of curvature, thickness of each lens element, the value of each air gap, aspherical data, related optical parameters, such as back focal length, the configuration of the concave/convex shape of the object-side surfaces L2A1, L4A1 and the image-side surface L5A2, and the position of an adjustable air gap; but the configuration of the concave/convex shape of surfaces, comprising the object-side surfaces L1A1, L3A1 and L3A2, L5A1 facing to the object side A1 and the image-side surfaces L1A2, L2A2 and L4A2 facing to the image side A2, and positive or negative configuration of the refracting power of each lens element L1, L2, L3, L4, L5 may be similar to those in the first embodiment. Specifically, in the present embodiment, the periphery region L2A1P of the object-side surface L2A1 of the second lens element L2 may be convex, the optical axis region L3A2C of the image-side surface L3A2 of the third lens element L3 may be convex, the optical axis region L4A1C of the object-side surface L4A1 of the fourth lens element L4 may be concave, and the optical axis region L5A2C of the image-side surface L5A2 of the fifth lens element L5 may be concave. The air gap between the third and fourth lens element L3, L4 is an adjustable air gap, i.e. G34 is adjustable. Two lens groups are formed in the first, second, third, fourth and fifth lens element L1, L2, L3, L4, L5 and the filtering unit TF. A first lens group comprises the first, second and third lens element L1, L2, L3. A second lens group comprises the fourth and fifth lens element L4, L5 and the filtering unit TF to the image plane IMG. When the optical imaging lens 3 focuses, an actuator, such as a voice coil motor, may control the movement of one of the first and second lens groups along the optical axis to adjust the adjustable air gap G34. Please refer to FIG. 18 for the optical characteristics of each lens elements in the optical imaging lens 3 the present embodiment, and please refer to FIG. 51 for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of the present embodiment, calculated at 20° C. when focusing on infinity.

As the longitudinal spherical aberration shown in FIG. 17(a), the offset of the off-axis light relative to the image point may be within about −0.01~0.03 mm. As the curvature of field in the sagittal direction shown in FIG. 17(b), the focus variation with regard to the three wavelengths in the whole field may fall within about −0.025~0.02 mm. As the curvature of field in the tangential direction shown in FIG. 17(c), the focus variation with regard to the three wavelengths in the whole field may fall within about −0.025~0.02 mm. As shown in FIG. 17(d), the variation of the distortion aberration may be within about −2.5~0%. Compared with the first embodiment, the curvature of field in the sagittal direction of the optical imaging lens 3 may be smaller. The optical imaging lens 3 may provide good imaging quality.

Further, from FIG. 18, the optical imaging lens 3 may provide a 35 mm equivalent focal length of 149.989 mm and greater magnification when mounted along with a wide-angle lens, compared with conventional optical imaging lenses. According to the data shown in FIG. 20, the absolute value of the distance difference between before and after adjusting the adjustable air gaps from infinity to 1.200 m with −20~60° C. temperature variation is merely within 0.163 mm, better than that in the first embodiment. Therefore, the limited service range of a current actuator is no longer a problem when the optical imaging lens 3, as a telephoto lens, focuses on an object the position of which may be varied from infinity to 1.200 m by adjusting the adjustable air gaps with an actuator.

Figure 21:
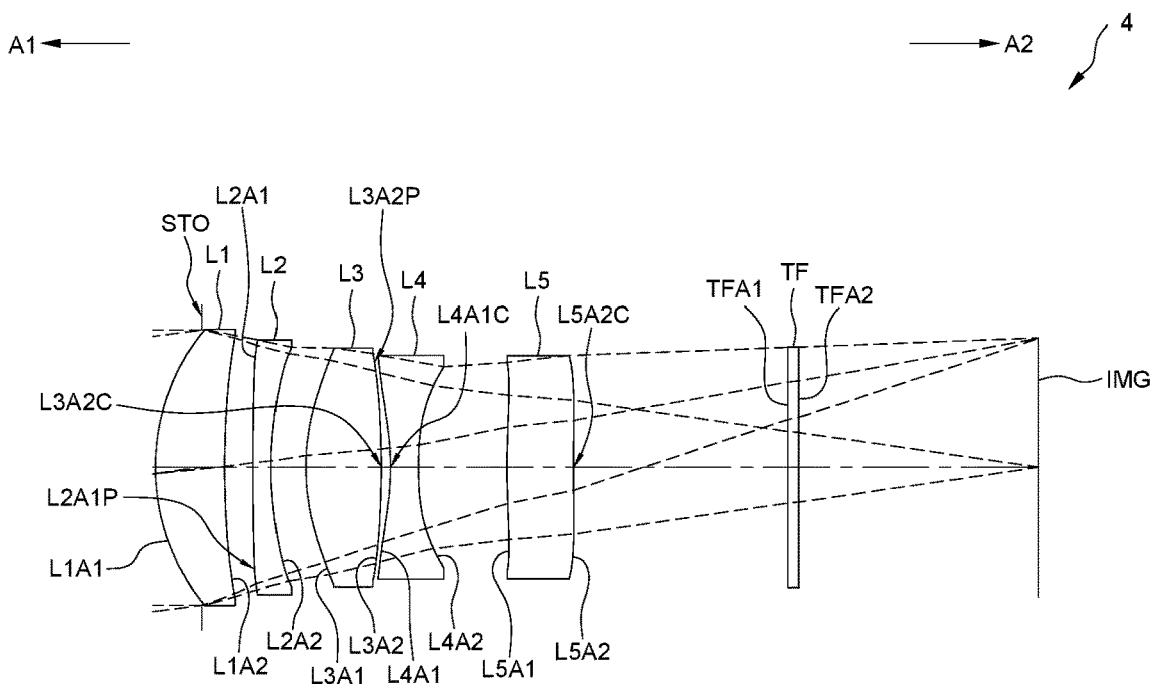
FIG. 21 depicts a cross-sectional view of a fourth embodiment of an optical imaging lens having five lens elements according to the present disclosure.
Figure 22:
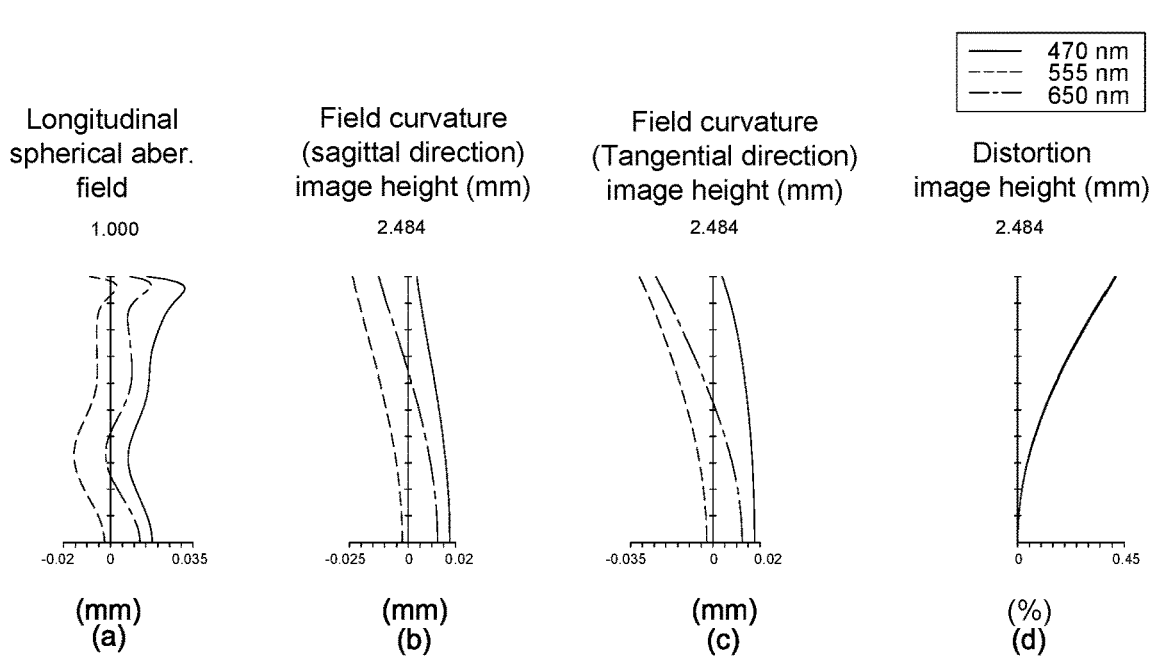
FIG. 22 depicts a chart of a longitudinal spherical aberration and other kinds of optical aberrations of a fourth embodiment of the optical imaging lens according the present disclosure.

Reference is now made to FIGS. 21-25. FIG. 21 illustrates an example cross-sectional view of an optical imaging lens 4 having five lens elements of the optical imaging lens according to a fourth example embodiment. FIG. 22 shows example charts of a longitudinal spherical aberration and other kinds of optical aberrations of the optical imaging lens 4 according to the fourth example embodiment. FIG. 23 shows an example table of optical data of each lens element of the optical imaging lens 4 according to the fourth example embodiment. FIG. 24 shows an example table of aspherical data of the optical imaging lens 4 according to the fourth example embodiment. FIG. 25 depicts data related to temperature and adjustable air gap of a fourth embodiment of the optical imaging lens according to the present disclosure. As shown in FIG. 21, the optical imaging lens 4 of the present embodiment, in an order from an object side A1 to an image side A2 along an optical axis, may comprise an aperture stop STO, a first lens element L1, a second lens element L2, a third lens element L3, a fourth lens element L4 and a fifth lens element L5.

The differences between the fourth embodiment and the first embodiment may include the radius of curvature, thickness of each lens element, the value of each air gap, aspherical data, related optical parameters, such as back focal length, the configuration of the concave/convex shape of the object-side surfaces L2A1, L4A1 and the image-side surfaces L3A2, L5A2, and the position of an adjustable air gap; but the configuration of the concave/convex shape of surfaces, comprising the object-side surfaces L1A1, L3A1 and L5A1 facing to the object side A1 and the image-side surfaces L1A2, L2A2 and L4A2 facing to the image side A2, and positive or negative configuration of the refracting power of each lens element L1, L2, L3, L4, L5 may be similar to those in the first embodiment. Specifically, in the present embodiment, the periphery region L2A1P of the object-side surface L2A1 of the second lens element L2 may be convex, the optical axis region L3A2C of the image-side surface L3A2 of the third lens element L3 may be convex, the periphery region L3A2P of the image-side surface L3A2 of the third lens element L3 may be convex, the optical axis region L4A1C of the object-side surface L4A1 of the fourth lens element L4 may be concave, and the optical axis region L5A2C of the image-side surface L5A2 of the fifth lens element L5 may be concave. The air gap between the third and fourth lens element L3, L4 is an adjustable air gap, i.e. G34 is adjustable. Two lens groups are formed in the first, second, third, fourth and fifth lens element L1, L2, L3, L4, L5 and the filtering unit TF. A first lens group comprises the first, second and third lens element L1, L2, L3. A second lens group comprises the fourth and fifth lens element L4, L5 and the filtering unit TF to the image plane IMG. When the optical imaging lens 4 focuses, an actuator, such as a voice coil motor, may control the movement of one of the first and second lens groups along the optical axis to adjust the adjustable air gap G34. Please refer to FIG. 23 for the optical characteristics of each lens elements in the optical imaging lens 4 the present embodiment, and please refer to FIG. 51 for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of the present embodiment, calculated at 20° C. when focusing on infinity.

As the longitudinal spherical aberration shown in FIG. 22(a), the offset of the off-axis light relative to the image point may be within about −0.02~0.035 mm. As the curvature of field in the sagittal direction shown in FIG. 22(b), the focus variation with regard to the three wavelengths in the whole field may fall within about −0.025~0.02 mm. As the curvature of field in the tangential direction shown in FIG. 22(c), the focus variation with regard to the three wavelengths in the whole field may fall within about −0.035~0.02 mm. As shown in FIG. 22(d), the variation of the distortion aberration may be within about 0~0.45%. Compared with the first embodiment, the distortion aberration of the optical imaging lens 4 may be smaller. The optical imaging lens 4 may provide good imaging quality.

Further, from FIG. 23, the optical imaging lens 4 may provide a 35 mm equivalent focal length of 160.492 mm and greater magnification when mounted along with a wide-angle lens, compared with conventional optical imaging lenses. According to the data shown in FIG. 25, the absolute value of the distance difference between before and after adjusting the adjustable air gaps from infinity to 1.200 m with −20~60° C. temperature variation is merely within 0.225 mm, better than that in the first embodiment. Therefore, the limited service range of a current actuator is no longer a problem when the optical imaging lens 4, as a telephoto lens, focuses on an object the position of which may be varied from infinity to 1.200 m by adjusting the adjustable air gaps with an actuator.

Figure 26:
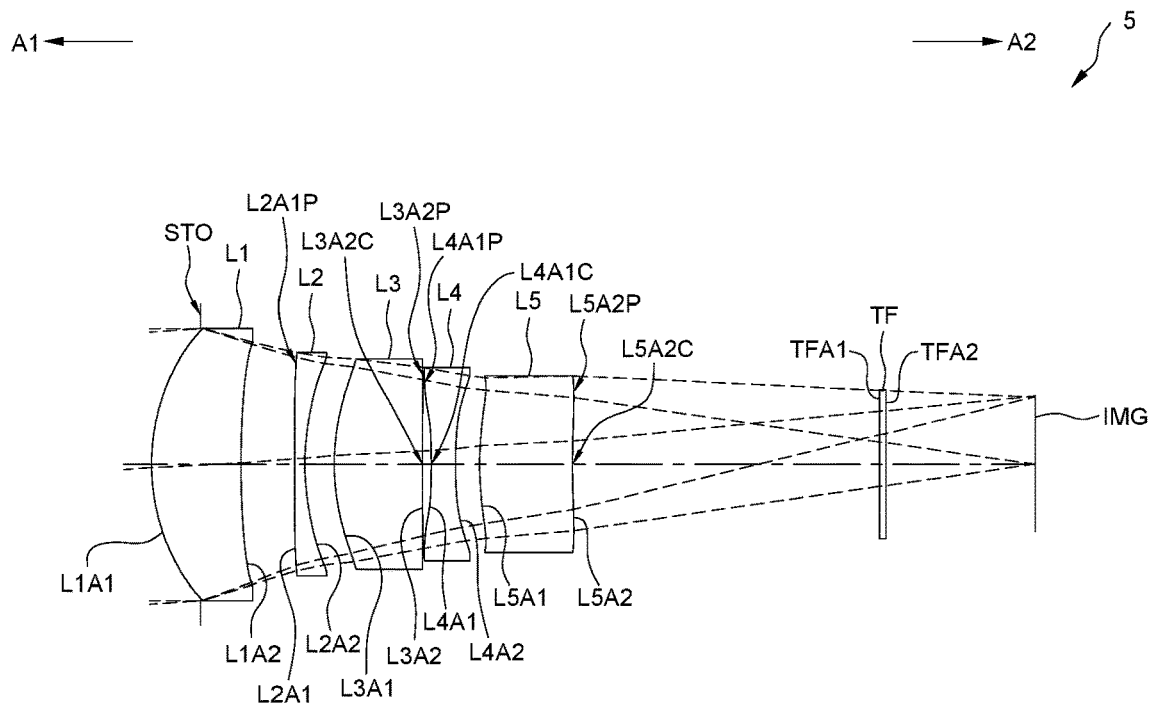
FIG. 26 depicts a cross-sectional view of a fifth embodiment of an optical imaging lens having five lens elements according to the present disclosure.
Figure 27:
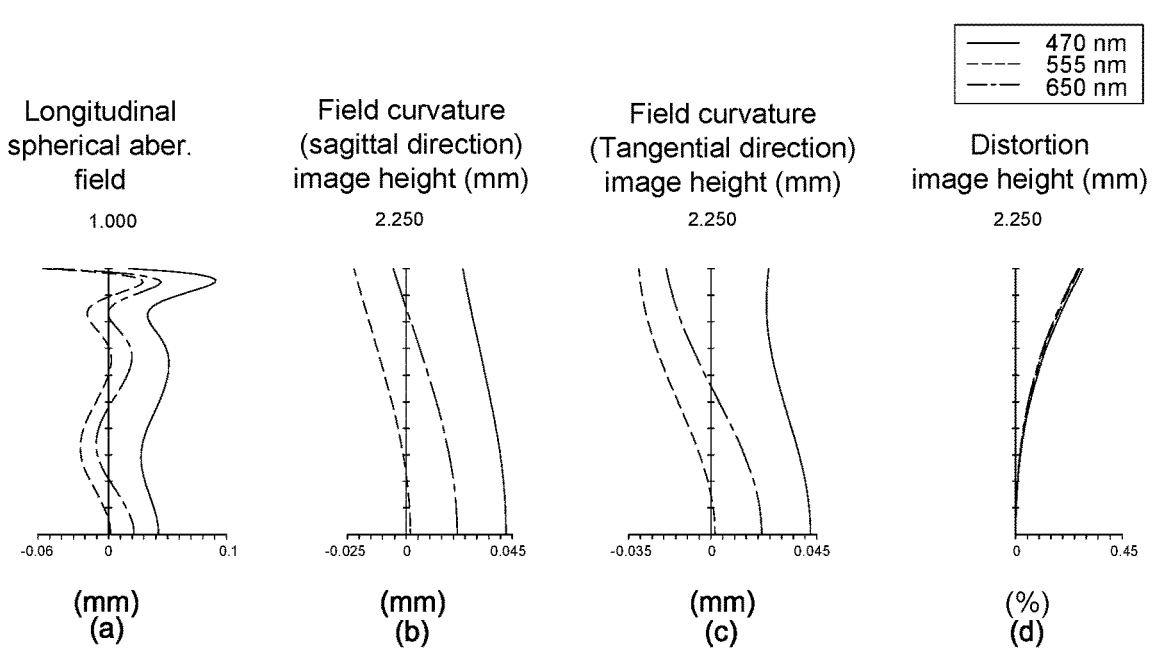
FIG. 27 depicts a chart of a longitudinal spherical aberration and other kinds of optical aberrations of a fifth embodiment of the optical imaging lens according the present disclosure.

Reference is now made to FIGS. 26-30. FIG. 26 illustrates an example cross-sectional view of an optical imaging lens 5 having five lens elements of the optical imaging lens according to a fifth example embodiment. FIG. 27 shows example charts of a longitudinal spherical aberration and other kinds of optical aberrations of the optical imaging lens 5 according to the fifth example embodiment. FIG. 28 shows an example table of optical data of each lens element of the optical imaging lens 5 according to the fifth example embodiment. FIG. 29 shows an example table of aspherical data of the optical imaging lens 5 according to the fifth example embodiment. FIG. 30 depicts data related to temperature and adjustable air gap of a fifth embodiment of the optical imaging lens according to the present disclosure. As shown in FIG. 26, the optical imaging lens 5 of the present embodiment, in an order from an object side A1 to an image side A2 along an optical axis, may comprise an aperture stop STO, a first lens element L1, a second lens element L2, a third lens element L3, a fourth lens element L4 and a fifth lens element L5.

The differences between the fifth embodiment and the first embodiment may include the radius of curvature, thickness of each lens element, the value of each air gap, aspherical data, related optical parameters, such as back focal length, the configuration of the concave/convex shape of the object-side surfaces L2A1, L4A1 and the image-side surfaces L3A2, L5A2, and the position of an adjustable air gap; but the configuration of the concave/convex shape of surfaces, comprising the object-side surfaces L1A1, L3A1 and L5A1 facing to the object side A1 and the image-side surfaces L1A2, L2A2 and L4A2 facing to the image side A2, and positive or negative configuration of the refracting power of each lens element L1, L2, L3, L4, L5 may be similar to those in the first embodiment. Specifically, in the present embodiment, the periphery region L2A1P of the object-side surface L2A1 of the second lens element L2 may be convex, the optical axis region L3A2C of the image-side surface L3A2 of the third lens element L3 may be convex, the periphery region L3A2P of the image-side surface L3A2 of the third lens element L3 may be convex, the optical axis region L4A1C of the object-side surface L4A1 of the fourth lens element L4 may be concave, the periphery region L4A1P of the object-side surface L4A1 of the fourth lens element L4 may be convex, and the optical axis region L5A2C of the image-side surface L5A2 of the fifth lens element L5 may be concave. The air gap between the first and second lens element L1, L2 is an adjustable air gap, i.e. G12 is adjustable. Two lens groups are formed in the first, second, third, fourth and fifth lens element L1, L2, L3, L4, L5 and the filtering unit TF. A first lens group comprises the first lens element L1. A second lens group comprises the second, third, fourth and fifth lens element L2, L3, L4, L5 and the filtering unit TF to the image plane IMG. When the optical imaging lens 5 focuses, an actuator, such as a voice coil motor, may control the movement of one of the first and second lens groups along the optical axis to adjust the adjustable air gap G12. Please refer to FIG. 28 for the optical characteristics of each lens elements in the optical imaging lens 5 the present embodiment, and please refer to FIG. 51 for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of the present embodiment, calculated at 20° C. when focusing on infinity.

As the longitudinal spherical aberration shown in FIG. 27(a), the offset of the off-axis light relative to the image point may be within about −0.06~0.1 mm. As the curvature of field in the sagittal direction shown in FIG. 27(b), the focus variation with regard to the three wavelengths in the whole field may fall within about −0.025~0.045 mm. As the curvature of field in the tangential direction shown in FIG. 27(c), the focus variation with regard to the three wavelengths in the whole field may fall within about −0.035~0.045 mm. As shown in FIG. 27(d), the variation of the distortion aberration may be within about 0~0.45%. Compared with the first embodiment, the distortion aberration of the optical imaging lens 5 may be smaller. The optical imaging lens 5 may provide good imaging quality.

Further, from FIG. 28, the optical imaging lens 5 may provide a 35 mm equivalent focal length of 300.201 mm and greater magnification when mounted along with a wide-angle lens, compared with conventional optical imaging lenses. According to the data shown in FIG. 30, the absolute value of the distance difference between before and after adjusting the adjustable air gaps from infinity to 1.200 m with −20~60° C. temperature variation is merely within 0.256 mm, better than that in the first embodiment. Therefore, the limited service range of a current actuator is no longer a problem when the optical imaging lens 5, as a telephoto lens, focuses on an object the position of which may be varied from infinity to 1.200 m by adjusting the adjustable air gaps with an actuator.

Figure 31:
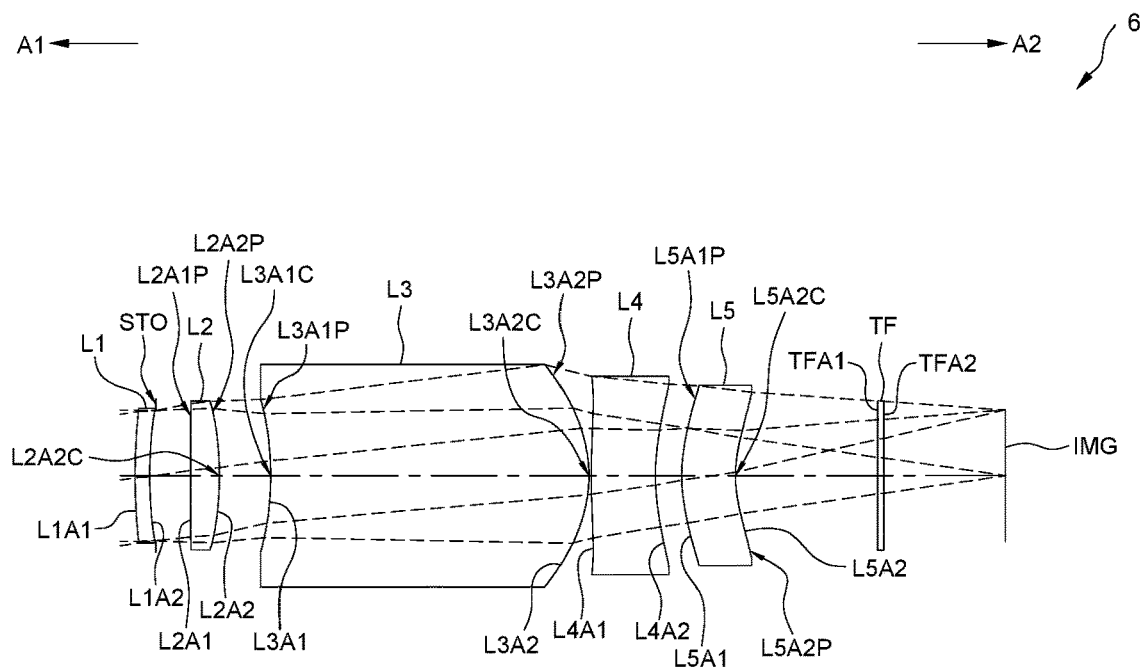
FIG. 31 depicts a cross-sectional view of a sixth embodiment of an optical imaging lens having five lens elements according to the present disclosure.
Figure 32:
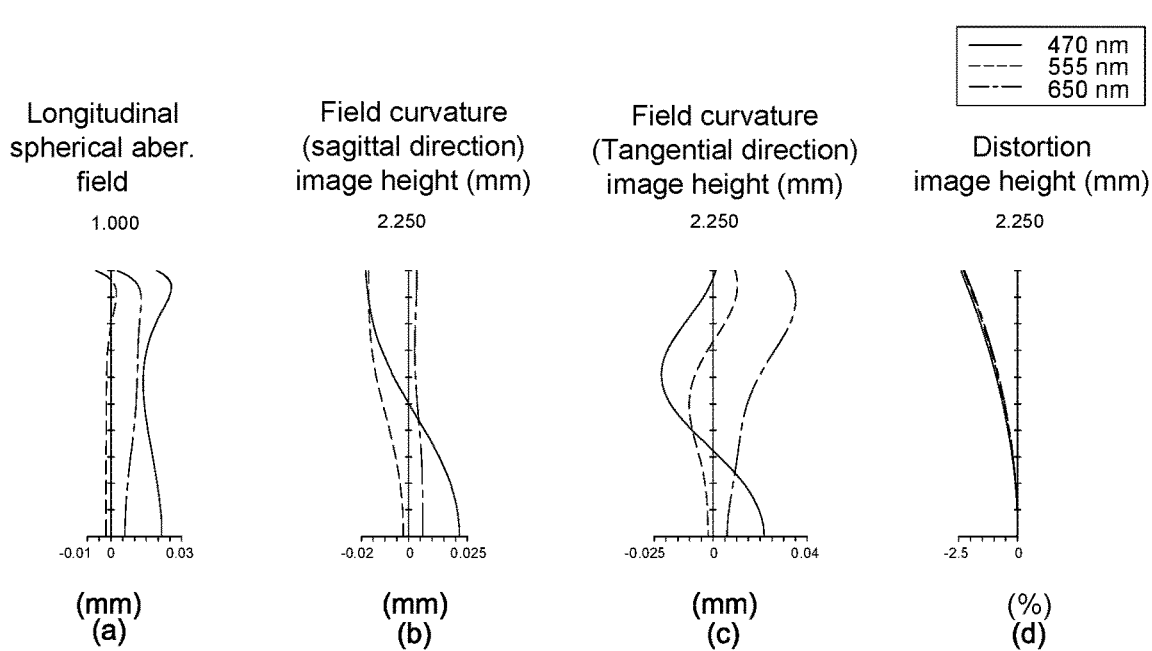
FIG. 32 depicts a chart of a longitudinal spherical aberration and other kinds of optical aberrations of a sixth embodiment of the optical imaging lens according the present disclosure.

Reference is now made to FIGS. 31-35. FIG. 31 illustrates an example cross-sectional view of an optical imaging lens 6 having five lens elements of the optical imaging lens according to a sixth example embodiment. FIG. 32 shows example charts of a longitudinal spherical aberration and other kinds of optical aberrations of the optical imaging lens 6 according to the sixth example embodiment. FIG. 33 shows an example table of optical data of each lens element of the optical imaging lens 6 according to the sixth example embodiment. FIG. 34 shows an example table of aspherical data of the optical imaging lens 6 according to the sixth example embodiment. FIG. 35 depicts data related to temperature and adjustable air gap of a sixth embodiment of the optical imaging lens according to the present disclosure. As shown in FIG. 31, the optical imaging lens 6 of the present embodiment, in an order from an object side A1 to an image side A2 along an optical axis, may comprise an aperture stop STO, a first lens element L1, a second lens element L2, a third lens element L3, a fourth lens element L4 and a fifth lens element L5.

The differences between the sixth embodiment and the first embodiment may include the radius of curvature, thickness of each lens element, the value of each air gap, aspherical data, related optical parameters, such as back focal length, the configuration of the concave/convex shape of the object-side surfaces L1A1 and the image-side surfaces L1A2, L4A2, the position of an adjustable air gap, the negative refracting power of the first lens element L1, the positive refracting power of the second lens element L2 and the negative refracting power of the fifth lens element L5; but the configuration of the concave/convex shape of surfaces, comprising the object-side surfaces L2A1, L3A1, L4A1 and L5A1 facing to the object side A1 and the image-side surfaces L2A2, L3A2 and L5A2 facing to the image side A2, and positive or negative configuration of the refracting power of the third and fourth lens element L3, L4 may be similar to those in the first embodiment. Specifically, in the present embodiment, the periphery region L2A1P of the object-side surface L2A1 of the second lens element L2 may be convex, the optical axis region L2A2C of the image-side surface L2A2 of the second lens element L2 may be convex, the periphery region L2A2P of the image-side surface L2A2 of the second lens element L2 may be convex, the optical axis region L3A1C of the image-side surface L3A2 of the third lens element L3 may be concave, the periphery region L3A1P of the image-side surface L3A2 of the third lens element L3 may be concave, the optical axis region L3A2C of the image-side surface L3A2 of the third lens element L3 may be convex, the periphery region L3A2P of the image-side surface L3A2 of the third lens element L3 may be convex, the periphery region L5A1P of the object-side surface L5A1 of the fifth lens element L5 may be convex, the optical axis region L5A2C of the image-side surface L5A2 of the fifth lens element L5 may be concave, and the periphery region L5A2P of the image-side surface L5A2 of the fifth lens element L5 may be concave. The air gap between the second and third lens element L2, L3 is an adjustable air gap, i.e. G23 is adjustable. Two lens groups are formed in the first, second, third, fourth and fifth lens element L1, L2, L3, L4, L5 and the filtering unit TF. A first lens group comprises the first and second lens element L1, L2. A second lens group comprises the third, fourth and fifth lens element L3, L4, L5 and the filtering unit TF to the image plane IMG. When the optical imaging lens 6 focuses, an actuator, such as a voice coil motor, may control the movement of one of the first and second lens groups along the optical axis to adjust the adjustable air gap G23. Please refer to FIG. 33 for the optical characteristics of each lens elements in the optical imaging lens 6 the present embodiment, and please refer to FIG. 51 for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of the present embodiment, calculated at 20° C. when focusing on infinity.

As the longitudinal spherical aberration shown in FIG. 32(a), the offset of the off-axis light relative to the image point may be within about −0.01~0.03 mm. As the curvature of field in the sagittal direction shown in FIG. 32(b), the focus variation with regard to the three wavelengths in the whole field may fall within about −0.02~0.025 mm. As the curvature of field in the tangential direction shown in FIG. 32(c), the focus variation with regard to the three wavelengths in the whole field may fall within about −0.025~0.04 mm. As shown in FIG. 32(d), the variation of the distortion aberration may be within about −2.5~0%. The optical imaging lens 6 may provide good imaging quality.

Further, from FIG. 33, the optical imaging lens 6 may provide a 35 mm equivalent focal length of 150.053 mm and greater magnification when mounted along with a wide-angle lens, compared with conventional optical imaging lenses. According to the data shown in FIG. 35, the absolute value of the distance difference between before and after adjusting the adjustable air gaps from infinity to 1.200 m with −20~60° C. temperature variation is merely within 0.786 mm. Therefore, the limited service range of a current actuator is no longer a problem when the optical imaging lens 6, as a telephoto lens, focuses on an object the position of which may be varied from infinity to 1.200 m by adjusting the adjustable air gaps with an actuator.

Figure 36:
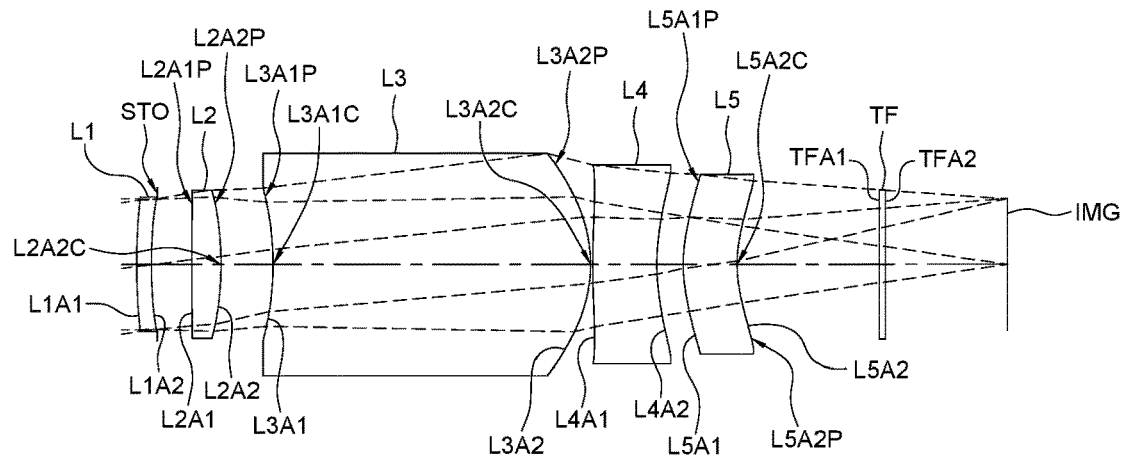
FIG. 36 depicts a cross-sectional view of a seventh embodiment of an optical imaging lens having five lens elements according to the present disclosure.
Figure 37:
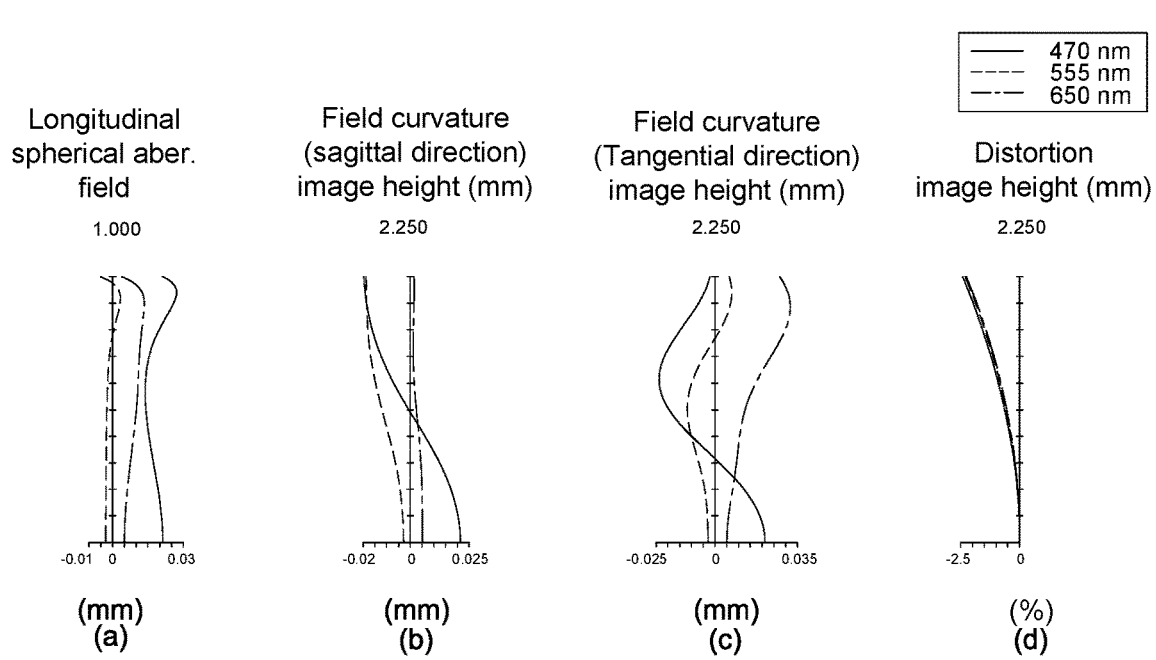
FIG. 37 depicts a chart of a longitudinal spherical aberration and other kinds of optical aberrations of a seventh embodiment of the optical imaging lens according to the present disclosure.

Reference is now made to FIGS. 36-40. FIG. 36 illustrates an example cross-sectional view of an optical imaging lens 7 having five lens elements of the optical imaging lens according to a seventh example embodiment. FIG. 37 shows example charts of a longitudinal spherical aberration and other kinds of optical aberrations of the optical imaging lens 7 according to the seventh example embodiment. FIG. 38 shows an example table of optical data of each lens element of the optical imaging lens 7 according to the seventh example embodiment. FIG. 39 shows an example table of aspherical data of the optical imaging lens 7 according to the seventh example embodiment. FIG. 40 depicts data related to temperature and adjustable air gap of a seventh embodiment of the optical imaging lens according to the present disclosure. As shown in FIG. 36, the optical imaging lens 7 of the present embodiment, in an order from an object side A1 to an image side A2 along an optical axis, may comprise an aperture stop STO, a first lens element L1, a second lens element L2, a third lens element L3, a fourth lens element L4 and a fifth lens element L5.

The differences between the seventh embodiment and the first embodiment may include the radius of curvature, thickness of each lens element, the value of each air gap, aspherical data, related optical parameters, such as back focal length, the configuration of the concave/convex shape of the object-side surface L1A1 and the image-side surfaces L1A2, L4A2, the position of an adjustable air gap, the negative refracting power of the first lens element L1, the positive refracting power of the second lens element L2 and the negative refracting power of the fifth lens element L5; but the configuration of the concave/convex shape of surfaces, comprising the object-side surfaces L2A1, L3A1, L4A1 and L5A1 facing to the object side A1 and the image-side surfaces L2A2, L3A2 and L5A2 facing to the image side A2, and positive or negative configuration of the refracting power of the third and fourth lens element L3, L4 may be similar to those in the first embodiment. Specifically, in the present embodiment, the periphery region L2A1P of the object-side surface L2A1 of the second lens element L2 may be convex, the optical axis region L2A2C of the image-side surface L2A2 of the second lens element L2 may be convex, the periphery region L2A2P of the image-side surface L2A2 of the second lens element L2 may be convex, the optical axis region L3A1C of the image-side surface L3A2 of the third lens element L3 may be concave, the periphery region L3A1P of the image-side surface L3A2 of the third lens element L3 may be concave, the optical axis region L3A2C of the image-side surface L3A2 of the third lens element L3 may be convex, the periphery region L3A2P of the image-side surface L3A2 of the third lens element L3 may be convex, the periphery region L5A1P of the object-side surface L5A1 of the fifth lens element L5 may be convex, the optical axis region L5A2C of the image-side surface L5A2 of the fifth lens element L5 may be concave, and the periphery region L5A2P of the image-side surface L5A2 of the fifth lens element L5 may be concave. The air gap between the third and fourth lens element L3, L4 is an adjustable air gap, i.e. G34 is adjustable. Two lens groups are formed in the first, second, third, fourth and fifth lens element L1, L2, L3, L4, L5 and the filtering unit TF. A first lens group comprises the first, second and third lens element L1, L2, L3. A second lens group comprises the fourth and fifth lens element L4, L5 and the filtering unit TF to the image plane IMG. When the optical imaging lens 7 focuses, an actuator, such as a voice coil motor, may control the movement of one of the first and second lens groups along the optical axis to adjust the adjustable air gap G34. Please refer to FIG. 38 for the optical characteristics of each lens elements in the optical imaging lens 7 the present embodiment, and please refer to FIG. 51 for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of the present embodiment, calculated at 20° C. when focusing on infinity.

As the longitudinal spherical aberration shown in FIG. 37(a), the offset of the off-axis light relative to the image point may be within about −0.01~0.03 mm. As the curvature of field in the sagittal direction shown in FIG. 37(b), the focus variation with regard to the three wavelengths in the whole field may fall within about −0.02~0.025 mm. As the curvature of field in the tangential direction shown in FIG. 37(c), the focus variation with regard to the three wavelengths in the whole field may fall within about −0.025~0.035 mm. As shown in FIG. 37(d), the variation of the distortion aberration may be within about −2.5~0%. The optical imaging lens 7 may provide good imaging quality.

Further, from FIG. 38, the optical imaging lens 7 may provide a 35 mm equivalent focal length of 150.126 mm and greater magnification when mounted along with a wide-angle lens, compared with conventional optical imaging lenses. According to the data shown in FIG. 40, the absolute value of the distance difference between before and after adjusting the adjustable air gaps from infinity to 1.200 m with −20~60° C. temperature variation is merely within 0.118 mm. Therefore, the limited service range of a current actuator is no longer a problem when the optical imaging lens 7, as a telephoto lens, focuses on an object the position of which may be varied from infinity to 1.200 m by adjusting the adjustable air gaps with an actuator. Compared with the sixth embodiment, the differences are the values of G34, BFL and using G34 as adjustable air gap. Due to the less fG, the absolute value of the distance difference between before and after adjusting the adjustable air gaps may be significantly reduced to 0.118 mm.

Figure 41:
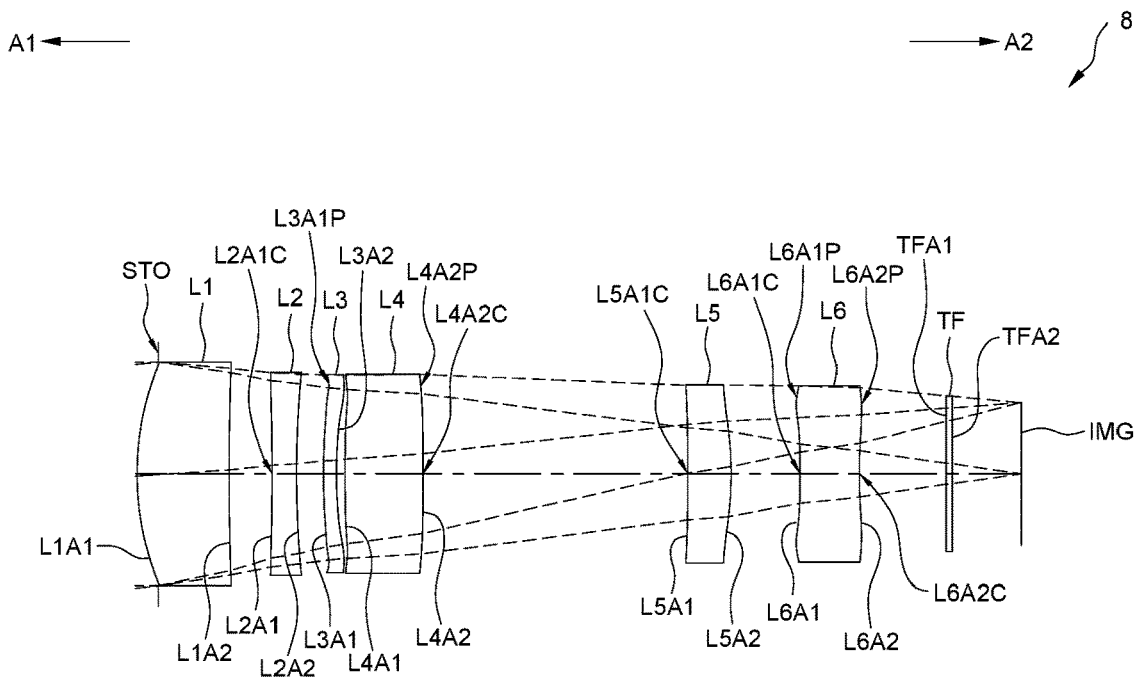
FIG. 41 depicts a cross-sectional view of an eighth embodiment of an optical imaging lens having six lens elements according to the present disclosure.
Figure 42:
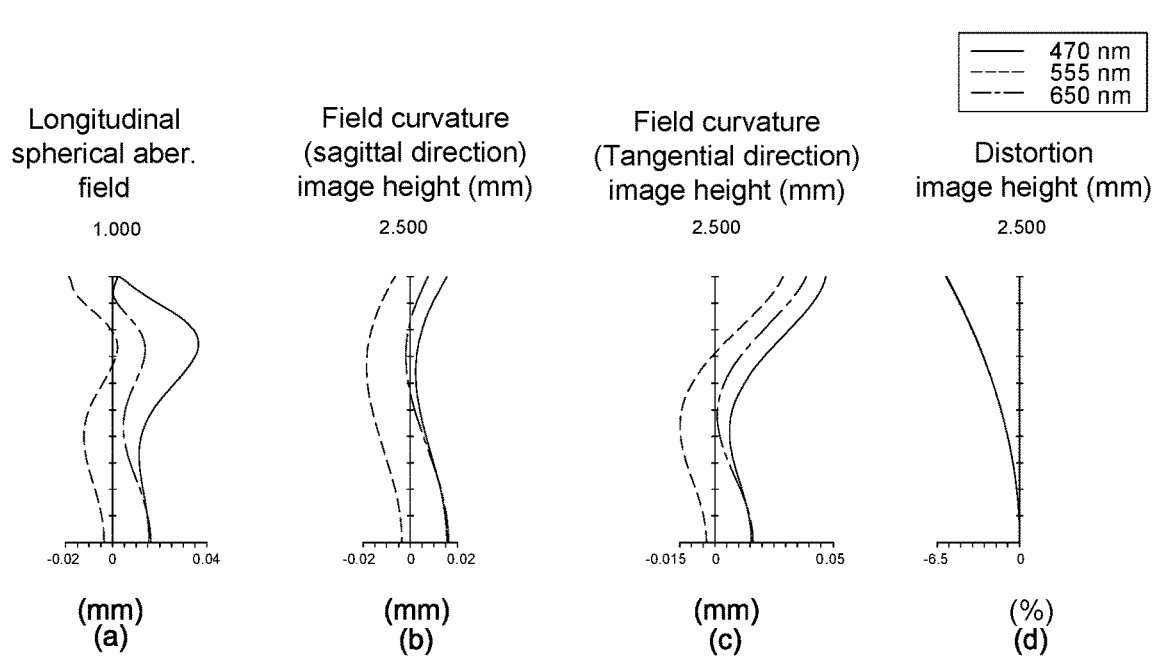
FIG. 42 depicts a chart of a longitudinal spherical aberration and other kinds of optical aberrations of an eighth embodiment of the optical imaging lens according to the present disclosure.

Reference is now made to FIGS. 41-45. FIG. 41 illustrates an example cross-sectional view of an optical imaging lens 8 having six lens elements of the optical imaging lens according to an eighth example embodiment. FIG. 42 shows example charts of a longitudinal spherical aberration and other kinds of optical aberrations of the optical imaging lens 8 according to the eighth example embodiment. FIG. 43 shows an example table of optical data of each lens element of the optical imaging lens 8 according to the eighth example embodiment. FIG. 44 shows an example table of aspherical data of the optical imaging lens 8 according to the eighth example embodiment. FIG. 45 depicts data related to temperature and adjustable air gap of an eighth embodiment of the optical imaging lens according to the present disclosure. As shown in FIG. 41, the optical imaging lens 8 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the eighth embodiment and the first embodiment may include the radius of curvature, thickness of each lens element, the value of each air gap, aspherical data, related optical parameters, such as back focal length, the configuration of the concave/convex shape of the object-side surfaces L2A1, L3A1, L5A1 and the image-side surface L4A2, the position of an adjustable air gap, the negative refracting power of the third lens element L3, the positive refracting power of the fourth lens element L4 and the additional sixth lens element L6; but the configuration of the concave/convex shape of surfaces, comprising the object-side surfaces L1A1 and L4A1 facing to the object side A1 and the image-side surfaces L1A2, L2A2, L3A2 and L5A2 facing to the image side A2, and positive or negative configuration of the refracting power of the first, second and fifth lens element L1, L2, L5 may be similar to those in the first embodiment. Specifically, in the present embodiment, the optical axis region L2A1C of the object-side surface L2A1 of the second lens element L2 may be concave, the periphery region L3A1P of the object-side surface L3A1 of the third lens element L3 may be concave, the optical axis region L4A2C of the image-side surface L4A2 of the fourth lens element L4 may be convex, the periphery region L4A2P of the image-side surface L4A2 of the fourth lens element L4 may be convex, the optical axis region L5A1C of the object-side surface L5A1 of the fifth lens element L5 may be convex, the optical axis region L5A2C of the image-side surface L5A2 of the fifth lens element L5 may be concave. The sixth lens element L6 has negative refracting power. On the object-side surface L6A1, an optical axis region L6A1C may be concave and a periphery region L6A1P may be convex. On the image-side surface L6A2, an optical axis region L6A2C may be concave and a periphery region L6A2P may be convex. The object-side surface L6A1 and the image-side surface L6A2 of the sixth lens element L6 are aspherical surfaces defined by the aspherical formula shown in the first embodiment. The air gap between the first and second lens element L1, L2 is an adjustable air gap, i.e. G12 is adjustable. Two lens groups are formed in the first, second, third, fourth, fifth and sixth lens element L1, L2, L3, L4, L5, L6 and the filtering unit TF. A first lens group comprises the first lens element L1. A second lens group comprises the second, third, fourth, fifth, sixth lens element L2, L3, L4, L5, L6 and the filtering unit TF to the image plane IMG. When the optical imaging lens 8 focuses, an actuator, such as a voice coil motor, may control the movement of one of the first and second lens group along the optical axis to adjust the adjustable air gap G12. Please refer to FIG. 43 for the optical characteristics of each lens elements in the optical imaging lens 8 the present embodiment, and please refer to FIG. 51 for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of the present embodiment, calculated at 20° C. when focusing on infinity.

As the longitudinal spherical aberration shown in FIG. 42(a), the offset of the off-axis light relative to the image point may be within about −0.02~0.04 mm. As the curvature of field in the sagittal direction shown in FIG. 42(b), the focus variation with regard to the three wavelengths in the whole field may fall within about −0.02~0.02 mm. As the curvature of field in the tangential direction shown in FIG. 42(c), the focus variation with regard to the three wavelengths in the whole field may fall within about −0.015~0.05 mm. As shown in FIG. 42(d), the variation of the distortion aberration may be within about −6.5~0%. The optical imaging lens 8 may provide good imaging quality.

Further, from FIG. 43, the optical imaging lens 8 may provide a 35 mm equivalent focal length of 236.121 mm, better than that of the first embodiment, and greater magnification when mounted along with a wide-angle lens, compared with conventional optical imaging lenses. According to the data shown in FIG. 45, the absolute value of the distance difference between before and after adjusting the adjustable air gaps from infinity to 1.200 m with −20~60° C. temperature variation is merely within 0.437 mm. Therefore, the limited service range of a current actuator is no longer a problem when the optical imaging lens 8, as a telephoto lens, focuses on an object the position of which may be varied from infinity to 1.200 m by adjusting the adjustable air gaps with an actuator.

Figure 46:
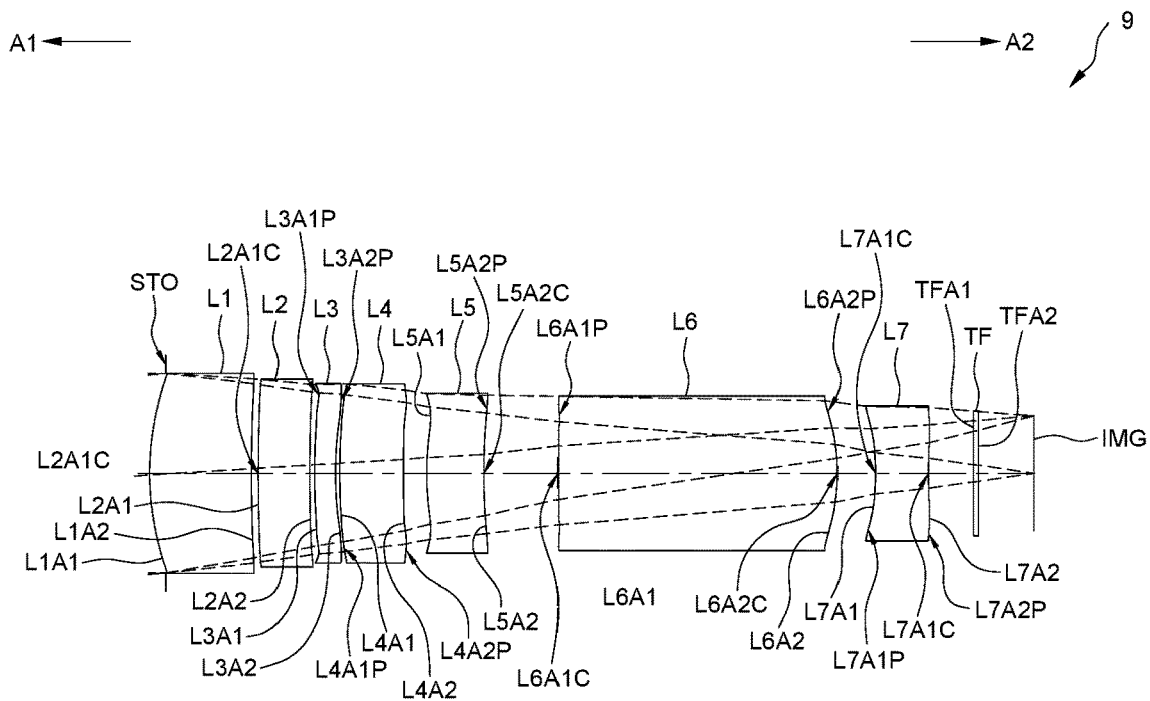
FIG. 46 depicts a cross-sectional view of a ninth embodiment of an optical imaging lens having seven lens elements according to the present disclosure.
Figure 47:
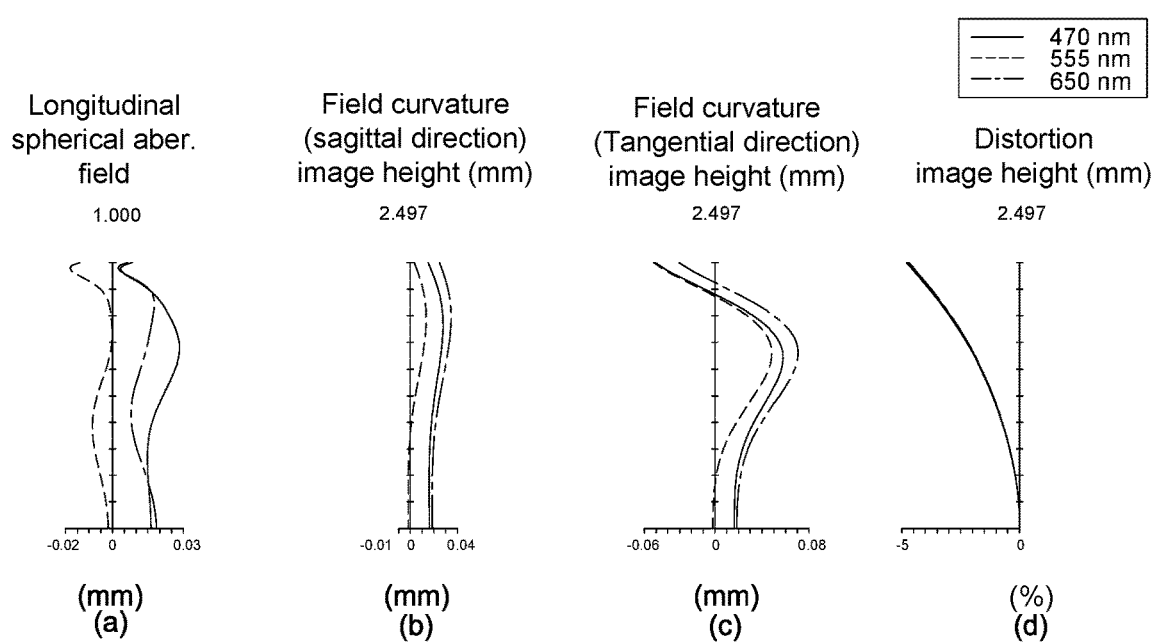
FIG. 47 depicts a chart of a longitudinal spherical aberration and other kinds of optical aberrations of a ninth embodiment of the optical imaging lens according to the present disclosure.

Reference is now made to FIGS. 46-50. FIG. 46 illustrates an example cross-sectional view of an optical imaging lens 9 having seven lens elements of the optical imaging lens according to a ninth example embodiment. FIG. 47 shows example charts of a longitudinal spherical aberration and other kinds of optical aberrations of the optical imaging lens 9 according to the ninth example embodiment. FIG. 48 shows an example table of optical data of each lens element of the optical imaging lens 9 according to the ninth example embodiment. FIG. 49 shows an example table of aspherical data of the optical imaging lens 9 according to the ninth example embodiment. FIG. 50 depicts data related to temperature and adjustable air gap of a ninth embodiment of the optical imaging lens according to the present disclosure. As shown in FIG. 46, the optical imaging lens 9 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the ninth embodiment and the first embodiment may include the radius of curvature, thickness of each lens element, the value of each air gap, aspherical data, related optical parameters, such as back focal length, the configuration of the concave/convex shape of the object-side surfaces L2A1, L3A1, L4A1 and the image-side surface L3A2, L4A2, L5A2, the position of an adjustable air gap, the negative refracting power of the third lens element L3, the positive refracting power of the fourth lens element L4, the negative refracting power of the fifth lens element L5, and the additional sixth and seventh lens element L6, L7; but the configuration of the concave/convex shape of surfaces, comprising the object-side surfaces L1A1 and L5A1 facing to the object side A1 and the image-side surfaces L1A2 and L5A2 facing to the image side A2, and positive or negative configuration of the refracting power of the first and second lens element L1, L2 may be similar to those in the first embodiment. Specifically, in the present embodiment, the periphery region L2A1P of the object-side surface L2A1 of the second lens element L2 may be convex, the periphery region L3A1P of the object-side surface L3A1 of the third lens element L3 may be concave, the periphery region L3A2P of the image-side surface L3A2 of the third lens element L3 may be convex, the periphery region L4A1P of the object-side surface L4A1 of the fourth lens element L4 may be convex, the periphery region L4A2P of the image-side surface L4A2 of the fourth lens element L4 may be convex, the optical axis region L5A2C of the image-side surface L5A2 of the fifth lens element L5 may be concave, and the periphery region L5A2P of the image-side surface L5A2 of the fifth lens element L5 may be concave. The sixth lens element L6 has positive refracting power. On the object-side surface L6A1, an optical axis region L6A1C may be convex and a periphery region L6A1P may be convex. On the image-side surface L6A2, an optical axis region L6A2C may be convex and a periphery region L6A2P may be convex. The seventh lens element L7 has negative refracting power. On the object-side surface L7A1, an optical axis region L7A1C may be concave and a periphery region L7A1P may be concave. On the image-side surface L7A2, an optical axis region L7A2C may be concave and a periphery region L7A2P may be convex. The object-side surface L6A1 and the image-side surface L6A2 of the sixth lens element L6 and the object-side surface L7A1 and the image-side surface L7A2 of the seventh lens element L7 are aspherical surfaces defined by the aspherical formula shown in the first embodiment. The air gap between the sixth and seventh lens element L6, L7 is an adjustable air gap, i.e. G67 is adjustable. Two lens groups are formed in the first, second, third, fourth, fifth, sixth and seventh lens element L1, L2, L3, L4, L5, L6, L7 and the filtering unit TF. A first lens group comprises the first, second, third, fourth, fifth, and sixth lens element L1, L2, L3, L4, L5, L6. A second lens group comprises the seventh lens element L7 and the filtering unit TF to the image plane IMG. When the optical imaging lens 9 focuses, an actuator, such as a voice coil motor, may control the movement of one of the first and second lens group along the optical axis to adjust the adjustable air gap G67. Please refer to FIG. 48 for the optical characteristics of each lens elements in the optical imaging lens 9 the present embodiment, and please refer to FIG. 51 for the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of the present embodiment, calculated at 20° C. when focusing on infinity.

As the longitudinal spherical aberration shown in FIG. 47(a), the offset of the off-axis light relative to the image point may be within about −0.02~0.03 mm. As the curvature of field in the sagittal direction shown in FIG. 47(b), the focus variation with regard to the three wavelengths in the whole field may fall within about −0.01~0.04 mm. As the curvature of field in the tangential direction shown in FIG. 47(c), the focus variation with regard to the three wavelengths in the whole field may fall within about −0.06~0.08 mm. As shown in FIG. 47(d), the variation of the distortion aberration may be within about −5~0%. The optical imaging lens 9 may provide good imaging quality.

Further, from FIG. 48, the optical imaging lens 9 may provide a 35 mm equivalent focal length of 261.369 mm, better than that of the first embodiment, and greater magnification when mounted along with a wide-angle lens, compared with conventional optical imaging lenses. According to the data shown in FIG. 50, the absolute value of the distance difference between before and after adjusting the adjustable air gaps from infinity to 1.200 m with −20~60° C. temperature variation is merely within 0.486 mm. Therefore, the limited service range of a current actuator is no longer a problem when the optical imaging lens 9, as a telephoto lens, focuses on an object the position of which may be varied from infinity to 1.200 m by adjusting the adjustable air gaps with an actuator.

Please refer to FIG. 51, which show the values of EFL/ImgH, TTL/ImgH, HFOV/ImgH, EFL/fG, EFL/(Fno*ImgH), EFL/BFL, TTL/TL, TTL/T1, TTL/(T2+G23+T3), ALT/AAG, (T1+G12+T3+G34)/(T4+G45+T5), (G23+T3+G34)/(T1+T2), (T4+G45+T5)/(T1+T2) and (T1+G12+T2+T4+G45+T5)/(G23+T3+G34) of all nine embodiments, and the optical imaging lens of the present disclosure may satisfy at least one of the Inequalities (1)~(3) and/or at least one of the Inequalities (4)~(16). Further, any range the upper and lower limits of which are defined by the values disclosed in all of the embodiments herein may be implemented in the present embodiments.

Figure 52:
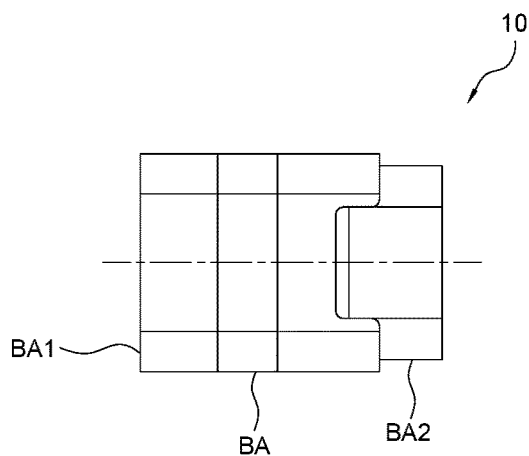
FIG. 52 depicts a lateral view of an appearance of a tenth embodiment of the optical imaging lens according to the present disclosure.
Figure 53:
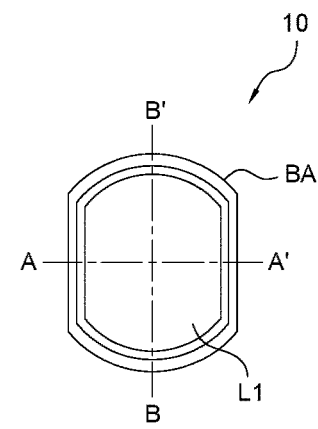
FIG. 53 depicts a front view of an appearance of a tenth embodiment of the optical imaging lens according to the present disclosure.
Figure 54:
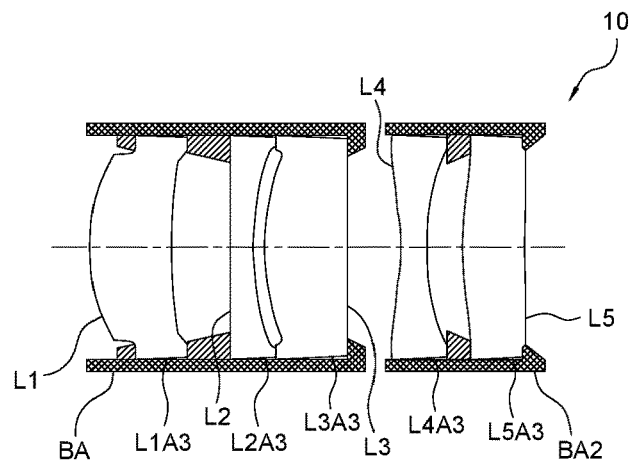
FIG. 54 depicts a cross-sectional view of a tenth embodiment of the optical imaging lens according to the present disclosure along AA' direction shown in FIG. 53.
Figure 55:
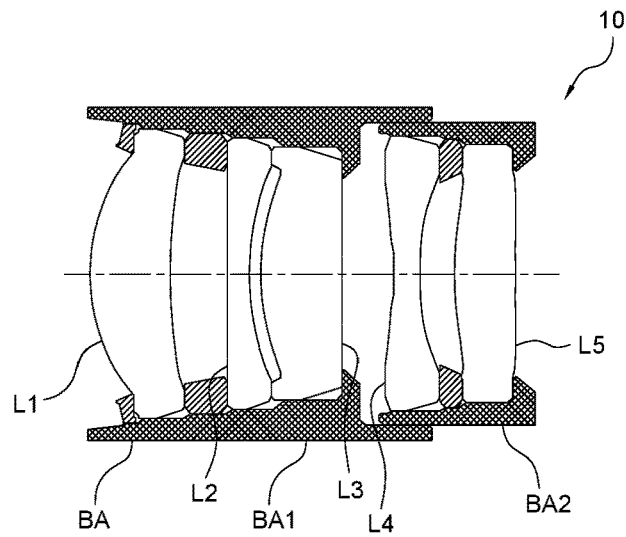
FIG. 55 depicts a cross-sectional view of a tenth embodiment of the optical imaging lens according to the present disclosure along BB' direction shown in FIG. 53.

For example, means for adjusting an adjustable air gap may be but not limited to a hardware structure driving the movement of one of two adjacent lens elements along the optical axis to adjust the width of the adjustable air gap. Please refer to FIGS. 52-55. FIG. 53 depicts a front view of an appearance of a tenth embodiment of the optical imaging lens according to the present disclosure. FIG. 54 depicts a cross-sectional view of a tenth embodiment of the optical imaging lens according to the present disclosure along AA' direction shown in FIG. 53. FIG. 55 depicts a cross-sectional view of a tenth embodiment of the optical imaging lens according to the present disclosure along BB' direction shown in FIG. 53. As shown in FIG. 52, the optical imaging lens 10 of the present embodiment, in an order from an object side A1 to an image side A2 along an optical axis, may comprise a first lens element L1, a second lens element L2, a third lens element L3, a fourth lens element L4, a fifth lens element L5 and a barrel BA. In the barrel BA, at least one of the first, second, third, fourth and fifth lens element L1, L2, L3, L4, L5 is received. The barrel BA may comprise two carrying portions BA1, BA2, inside of which at least one lens element is received. For example, the first, second and third lens element L1, L2, L3 are received in the carrying portion BA1, and the fourth and fifth lens element L4, L5 are received in the carrying portion BA2. An actuator (not shown), such as a voice coil motor, is capable to drive the movement of one of the carrying portions BA1, BA2 to do relative movement between the carrying portions BA1, BA2 along the optical axis. Thus, an adjustable air gap between two adjacent lens elements, such the adjustable air gap between the third and fourth lens element L3, L4, may be adjusted.

To further reduce the whole size of the optical imaging lens 10, two measurements may be applied. One, a sectional plane may be formed on an outer surface of the barrel BA. Two, another sectional plane may be formed between the object-side and image-side surfaces of at least one of the first, second, third, fourth and fifth lens element L1, L2, L3, L4, L5. The former measurement may reduce the whole size of the optical imaging lens 10 by reducing the size of the barrel BA. The later measurement may reduce the whole size of the optical imaging lens 10 by reducing the size of the lens element(s). In the present embodiment, all of the first, second, third, fourth and fifth lens elements L1, L2, L3, L4, L5 are formed with a sectional plane L1A3, L2A3, L3A3, L4A3, L5A3 between the object-side and image-side surfaces L2A1, L3A1, L4A1, L5A1, L1A2, L2A2, L3A2, L4A2, L5A2 for example. In some embodiment, there may be lens elements having a sectional plane and not having a sectional plane. In a lens element, an optical boundary of the lens element which has the sectional plane is different from another optical boundary of the lens element which do not have the sectional plane. Specifically, a lens element having a sectional plane may loss some optical effective diameter, a whole image may be shown on a display of a mobile electronic device. As shown in FIG. 54, along the AA' direction shown in FIG. 53, the optical boundaries of the object-side and image-side surfaces L1A1, L2A1, L3A1, L4A1, L5A1, L1A2, L2A2, L3A2, L4A2, L5A2 of the first, second, third, fourth and fifth lens elements L1, L2, L3, L4, L5 are all arc shape. As shown in FIG. 55, along the BB' direction shown in FIG. 53, the optical boundaries of the object-side and image-side surfaces L1A1, L2A1, L3A1, L4A1, L5A1, L1A2, L2A2, L3A2, L4A2, L5A2 of the first, second, third, fourth and fifth lens elements L1, L2, L3, L4, L5 are all flat defined by the sectional plane L1A3, L2A3, L3A3, L4A3, L5A3.

Figure 56:
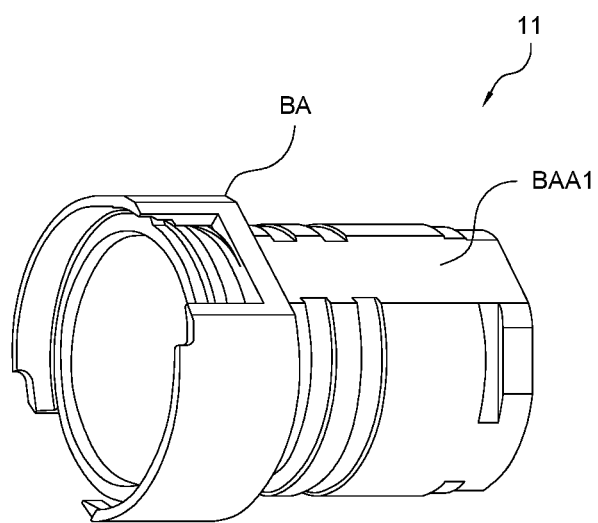
FIG. 56 depicts an appearance of an eleventh embodiment of the optical imaging lens according to the present disclosure.

Please refer to FIG. 56, which depicts an appearance of an eleventh embodiment of the optical imaging lens according to the present disclosure. One of the aforementioned measurements may be applied here. For example, a sectional plane BAA1 parallel to the optical axis is formed on an outer surface of the barrel BA.

The optical imaging lenses 1-9 as mentioned in the first to ninth embodiments may comprise a barrel BA as disclosed in one of the ninth and tenth embodiments, other types of barrel or other hardware structure driving the movement of one of two adjacent lens elements along the optical axis to adjust an adjustable air gap between the adjacent lens elements.

According to above illustration, the longitudinal spherical aberration, curvature of field in both the sagittal direction and tangential direction and distortion aberration in all embodiments may meet the user requirement of a related product in the market. The off-axis light with regard to three different wavelengths (470 nm, 555 nm, 650 nm) may be focused around an image point and the offset of the off-axis light relative to the image point may be well controlled with suppression for the longitudinal spherical aberration, curvature of field both in the sagittal direction and tangential direction and distortion aberration. The curves of different wavelengths may be close to each other, and this represents that the focusing for light having different wavelengths may be good to suppress chromatic dispersion. In summary, lens elements are designed and matched for achieving good imaging quality.

While various embodiments in accordance with the disclosed principles are described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Further, all of the numerical ranges including the maximum and minimum values and the values therebetween which are obtained from the combining proportion relation of the optical parameters disclosed in each embodiment of the present disclosure are implementable.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first element, a second element, a third element, a fourth element and a fifth lens element sequentially from an object side to an image side along an optical axis, each of the first, second, third, fourth and fifth lens element having an object-side surface facing toward the object side and allowing imaging rays to pass through and an image-side surface facing toward the image side and allowing the imaging rays to pass through, wherein:
the first lens element being arranged to be a lens element having refracting power in a first order from the object side to the image side, the second lens element being arranged to be a lens element having refracting power in a second order from the object side to the image side, the third lens element being arranged to be a lens element having refracting power in a third order from the object side to the image side, the fourth lens element being arranged to be a lens element having refracting power in a fourth order from the object side to the image side, the fifth lens element being arranged to be a lens element having refracting power in a fifth order from the object side to the image side;
the optical imaging lens has an adjustable air gap between two adjacent lens elements;
the optical imaging lens comprises no greater than seven lens elements having refracting power; and
an effective focal length of the optical imaging lens is represented by EFL, an image height of the optical imaging lens is represented by ImgH, a sum of the thicknesses of five lens elements from the first lens element to the fifth lens element along the optical axis is represented by ALT, a sum of four air gaps from the first lens element to the fifth lens element along the optical axis is represented by AAG, and EFL, ImgH, ALT and AAG satisfy:

$6.900 \leq EFL/ImgH$ and $1.300 \leq ALT/AAG$.

2. The optical imaging lens according to claim 1, wherein an effective focal length of the optical imaging lens after adjusting the adjustable air gap is represented by EFLA, and EFL and EFLA satisfy the inequality:

$0.800 \leq EFL/EFLA \leq 1.200$.

3. The optical imaging lens according to claim 1, further comprising a barrel, at least one of the first lens element, the second lens element, the third lens element, the fourth lens element and the fifth lens element is received in the barrel, and a sectional plane is formed on an outer surface of the barrel.

4. The optical imaging lens according to claim 1, further comprising:
an optical axis region of the image-side surface of the first lens element is concave;
the third lens element has positive refracting power;
the fourth lens element has negative refracting power;
an optical axis region of the image-side surface of the fourth lens element is concave; and
an optical axis region of the object-side surface of the fifth lens element is convex.

5. The optical imaging lens according to claim 1, wherein a f-number of the optical imaging lens is represented by Fno, and EFL and Fno satisfy the inequality:

$$2.000 \leq EFL/(Fno*ImgH).$$

6. The optical imaging lens according to claim 1, wherein a distance from the object-side surface of the first lens element to an image plane along the optical axis is represented by TTL, a thickness of the second lens element along the optical axis is represented by T2, a distance from the image-side surface of the second lens element to the object-side surface of the third lens element along the optical axis is represented by G23, a thickness of the third lens element along the optical axis is represented by T3, and TTL, T2, G23 and T3 satisfy the inequality:

$$4.000 \leq TTL/(T2+G23+T3).$$

7. The optical imaging lens according to claim 1, wherein a distance from the image-side surface of the second lens element to the object-side surface of the third lens element along the optical axis is represented by G23, a thickness of the third lens element along the optical axis is represented by T3, a distance from the image-side surface of the third lens element to the object-side surface of the fourth lens element along the optical axis is represented by G34, a thickness of the first lens element along the optical axis is represented by T1, a thickness of the second lens element along the optical axis is represented by T2, and G23, T3, G34, T1 and T2 satisfy the inequality:

$$1.200 \leq (G23+T3+G34)/(T1+T2).$$

8. An optical imaging lens, comprising a first element, a second element, a third element, a fourth element and a fifth lens element sequentially from an object side to an image side along an optical axis, each of the first, second, third, fourth and fifth lens element having an object-side surface facing toward the object side and allowing imaging rays to pass through and an image-side surface facing toward the image side and allowing the imaging rays to pass through, wherein:

the first lens element being arranged to be a lens element having refracting power in a first order from the object side to the image side, the second lens element being arranged to be a lens element having refracting power in a second order from the object side to the image side, the third lens element being arranged to be a lens element having refracting power in a third order from the object side to the image side, the fourth lens element being arranged to be a lens element having refracting power in a fourth order from the object side to the image side, the fifth lens element being arranged to be a lens element having refracting power in a fifth order from the object side to the image side;

the optical imaging lens has an adjustable air gap between two adjacent lens elements;

the optical imaging lens comprises no greater than seven lens elements having refracting power; and a distance from the object-side surface of the first lens element to an image plane along the optical axis is represented by TTL, an image height of the optical imaging lens is represented by ImgH, a sum of the thicknesses of five lens elements from the first lens element to the fifth lens element along the optical axis is represented by ALT, a sum of four air gaps from the first lens element to the fifth lens element along the optical axis is represented by AAG, an effective focal length of the optical imaging lens is represented by EFL, a focal length of a lens-group between the object side and a first adjustable air gap, wherein the first adjustable air gap is an adjustable air gap in a first order from the object side to the image side, is represented by fG, and TTL, ImgH, ALT, AAG, EFL and fG satisfy:

$$6.900 \leq EFL/ImgH, 1.300 \leq ALT/AAG \text{ and } 1.200 \leq EFL/fG.$$

9. The optical imaging lens according to claim 8, wherein an absolute value of maximum difference in distance between before and after adjusting the adjustable air gap is less or equal to 1.000 mm, and the maximum difference in distance between before and after adjusting the adjustable air gap is a distance of an adjustable air gap when the optical imaging lens focuses on an object at 1.200 m at 60° C. minus a distance of an adjustable air gap when the optical imaging lens focuses on an object at infinity at 20° C.

10. The optical imaging lens according to claim 8, wherein a sectional plane is formed between the object-side surface and the image-side surface of at least one of the first lens element, the second lens element, the third lens element, the fourth lens element and the fifth lens element, and an optical boundary of the lens element which has the sectional plane is different from another optical boundary of the lens element which do not have the sectional plane.

11. The optical imaging lens according to claim 8, wherein a half field of view of the optical imaging lens is represented by HFOV, and HFOV satisfies the inequality:

$$HFOV \leq 9.000°.$$

12. The optical imaging lens according to claim 8, wherein a distance from the object-side surface of the first lens element to the image-side surface of the fifth lens element along the optical axis is represented by TL, and TTL and TL satisfy the inequality:

$$1.400 \leq TTL/TL.$$

13. The optical imaging lens according to claim 8, a thickness of the fourth lens element along the optical axis is represented by T4, a distance from the image-side surface of the fourth lens element to the object-side surface of the fifth lens element along the optical axis is represented by G45, a thickness of the fifth lens element along the optical axis is represented by T5, a thickness of the first lens element along the optical axis is represented by T1, a thickness of the second lens element along the optical axis is represented by T2, and T4, G45, T5, T1 and T2 satisfy the inequality:

$$0.700 \leq (T4+G45+T5)/(T1+T2).$$

14. An optical imaging lens, comprising a first element, a second element, a third element, a fourth element and a fifth lens element sequentially from an object side to an image side along an optical axis, each of the first, second, third, fourth and fifth lens element having an object-side surface facing toward the object side and allowing imaging rays to pass through and an image-side surface facing toward the image side and allowing the imaging rays to pass through, wherein:

the first lens element being arranged to be a lens element having refracting power in a first order from the object side to the image side, the second lens element being arranged to be a lens element having refracting power in a second order from the object side to the image side, the third lens element being arranged to be a lens element having refracting power in a third order from the object side to the image side, the fourth lens element being arranged to be a lens element having refracting power in a fourth order from the object side to the image side, the fifth lens element being arranged to be a lens element having refracting power in a fifth order from the object side to the image side;

the optical imaging lens has an adjustable air gap between two adjacent lens elements;

an absolute value of maximum difference in distance between before and after adjusting the adjustable air gap is less or equal to 1.000 mm, and the maximum difference in distance between before and after adjusting the adjustable air gap is a distance of an adjustable air gap when the optical imaging lens focuses on an object at 1.200 m at 60° C. minus a distance of an adjustable air gap when the optical imaging lens focuses on an object at infinity at 20° C.;

the optical imaging lens comprises no greater than seven lens elements having refracting power; and a half field of view of the optical imaging lens is represented by HFOV, an image height of the optical imaging lens is represented by ImgH, and HFOV and ImgH satisfy:

$HFOV/ImgH \leq 3.800°/mm$.

15. The optical imaging lens according to claim 14, wherein an effective focal length of the optical imaging lens is represented by EFL, a focal length of a lens-group between the object side and a first adjustable air gap is represented by fG, wherein the first adjustable air gap is an adjustable air gap in a first order from the object side to the image side, and EFL and fG satisfy the inequality:

$1.200 \leq EFL/fG$.

16. The optical imaging lens according to claim 14, wherein an effective focal length of the optical imaging lens is represented by EFL, a distance from the image-side surface of the fifth lens element to an image plane along the optical axis is represented by BFL, and EFL and BFL satisfy the inequality:

$EFL/BFL \leq 2.800$.

17. The optical imaging lens according to claim 14, wherein a distance from the object-side surface of the first lens element to an image plane along the optical axis is represented by TTL, a thickness of the first lens element along the optical axis is represented by T1, and TTL and T1 satisfy the inequality:

$6.000 \leq TTL/T1$.

18. The optical imaging lens according to claim 14, wherein a thickness of the first lens element along the optical axis is represented by T1, a distance from the image-side surface of the first lens element to the object-side surface of the second lens element along the optical axis is represented by G12, a thickness of the third lens element along the optical axis is represented by T3, a distance from the image-side surface of the third lens element to the object-side surface of the fourth lens element along the optical axis is represented by G34, a thickness of the fourth lens element along the optical axis is represented by T4, a distance from the image-side surface of the fourth lens element to the object-side surface of the fifth lens element along the optical axis is represented by G45, a thickness of the fifth lens element along the optical axis is represented by T5, and T1, G12, T3, G34, T4, G45 and T5 satisfy the inequality:

$0.900 \leq (T1+G12+T3+G34)/(T4+G45+T5)$.

19. The optical imaging lens according to claim 14, wherein a thickness of the first lens element along the optical axis is represented by T1, a distance from the image-side surface of the first lens element to the object-side surface of the second lens element along the optical axis is represented by G12, a thickness of the second lens element along the optical axis is represented by T2, a thickness of the fourth lens element along the optical axis is represented by T4, a distance from the image-side surface of the fourth lens element to the object-side surface of the fifth lens element along the optical axis is represented by G45, a thickness of the fifth lens element along the optical axis is represented by T5, a distance from the image-side surface of the second lens element to the object-side surface of the third lens element along the optical axis is represented by G23, a thickness of the third lens element along the optical axis is represented by T3, a distance from the image-side surface of the third lens element to the object-side surface of the fourth lens element along the optical axis is represented by G34, and T1, G12, T2, T4, G45, T5, G23, T3 and G34 satisfy the inequality:

$(T1+G12+T2+T4+G45+T5)/(G23+T3+G34) \leq 2.500$.

* * * * *